US007810149B2

(12) United States Patent
Islam et al.

(10) Patent No.: US 7,810,149 B2
(45) Date of Patent: Oct. 5, 2010

(54) ARCHITECTURE FOR MOBILE IPV6 APPLICATIONS OVER IPV4

(76) Inventors: Junaid Islam, 2341 Cottle Rd., San Jose, CA (US) 95125; John S. McFarlane, 21343 Sarahills Dr., Saratoga, CA (US) 95070; Carl Williams, 3790 El Camino Real, #154, Palo Alto, CA (US) 94306

( * ) Notice: Subject to any disclaimer, the term of this patent is extended or adjusted under 35 U.S.C. 154(b) by 1072 days.

(21) Appl. No.: 11/468,281

(22) Filed: Aug. 29, 2006

(65) Prior Publication Data
US 2007/0050613 A1      Mar. 1, 2007

Related U.S. Application Data

(60) Provisional application No. 60/596,077, filed on Aug. 29, 2005.

(51) Int. Cl.
*G06F 9/00*        (2006.01)
*G06F 15/16*       (2006.01)
*G06F 17/00*       (2006.01)

(52) U.S. Cl. ............................ 726/11; 726/1; 726/26; 713/150

(58) Field of Classification Search .............. 713/150; 726/11, 26, 1
See application file for complete search history.

(56) References Cited

U.S. PATENT DOCUMENTS

| 6,674,758 | B2 * | 1/2004 | Watson ..................... 370/401 |
| 6,865,184 | B2 * | 3/2005 | Thubert et al. .............. 370/401 |
| 7,009,984 | B2 * | 3/2006 | Watson ..................... 370/401 |
| 7,031,328 | B2 * | 4/2006 | Thubert et al. .............. 370/401 |
| 7,149,225 | B2 * | 12/2006 | Thubert et al. .............. 370/401 |
| 7,207,063 | B1 * | 4/2007 | Fluhrer ..................... 726/14 |
| 7,421,736 | B2 * | 9/2008 | Mukherjee et al. ........... 726/15 |
| 7,453,887 | B2 * | 11/2008 | Thubert et al. ............ 370/395.52 |
| 7,496,107 | B1 * | 2/2009 | Watson ..................... 370/401 |
| 7,516,486 | B2 * | 4/2009 | Olivereau et al. ............. 726/13 |
| 7,551,632 | B2 * | 6/2009 | Thubert et al. .............. 370/401 |
| 7,639,686 | B2 * | 12/2009 | Wetterwald et al. .......... 370/392 |
| 7,644,171 | B2 * | 1/2010 | Sturniolo et al. ............. 709/230 |
| 7,650,424 | B2 * | 1/2010 | Armitage ................... 709/238 |
| 7,746,891 | B2 * | 6/2010 | Yamamoto et al. ............ 370/466 |
| 2002/0026525 | A1 * | 2/2002 | Armitage ................... 709/238 |
| 2002/0069278 | A1 * | 6/2002 | Forslow .................... 709/225 |
| 2003/0204605 | A1 * | 10/2003 | Hudson et al. ............... 709/228 |

(Continued)

OTHER PUBLICATIONS

Thakolsri et al., "Transition Mechanism in IP-Based Wireless Networks," Applications and the Internet Workshops, 2004, SAINT 2004 Workshops, 2004 International Synposium Jan. 26-30, 2004, pp. 112-119.

(Continued)

*Primary Examiner*—David Garcia Cervetti
(74) *Attorney, Agent, or Firm*—Aka Chan LLP

(57) ABSTRACT

Mobile clients can execute IPv6 applications in an IPv4 environment without the need for any specialized IPv6 hardware or upgrades to the network infrastructure. The architecture provides a seamless, disruption-free connectivity experience for mobile clients. Mobile clients are automatically connected to other mobile clients irrespective of their network connectively, whether wireless, wire line, IPv4, IPv6, public or private. Mobile clients communicate with other mobile clients using a secure, end-to-end IPv6 tunnel. This creates a persistent VPN connection between two clients using software.

25 Claims, 15 Drawing Sheets

U.S. PATENT DOCUMENTS

| | | | |
|---|---|---|---|
| 2004/0070678 A1* | 4/2004 | Toyama et al. | 348/231.3 |
| 2004/0100953 A1* | 5/2004 | Chen et al. | 370/389 |
| 2005/0190273 A1* | 9/2005 | Toyama et al. | 348/231.5 |
| 2006/0009213 A1* | 1/2006 | Sturniolo et al. | 455/426.1 |
| 2006/0045068 A1* | 3/2006 | Wu et al. | 370/352 |
| 2006/0098588 A1* | 5/2006 | Zhang et al. | 370/255 |
| 2006/0123079 A1* | 6/2006 | Sturniolo et al. | 709/203 |
| 2006/0182100 A1* | 8/2006 | Li et al. | 370/389 |
| 2006/0185012 A1* | 8/2006 | Olivereau et al. | 726/14 |
| 2006/0227792 A1* | 10/2006 | Wetterwald et al. | 370/395.52 |
| 2007/0245000 A1* | 10/2007 | Chen et al. | 709/222 |
| 2008/0043758 A1* | 2/2008 | Giaretta et al. | 370/400 |
| 2008/0281950 A1* | 11/2008 | Wald et al. | 709/223 |

OTHER PUBLICATIONS

Jeong et al., "Dynamic Tunnel Management Protocol for IPv4 Traversal of IPv6 Mobile Network," Vehicular Technology Conference, 2004, VTC 2004-Fall 2004, IEEE 60th, vol. 7, Sep. 26-29, 2004, pp. 4754-4757.

* cited by examiner

IPv4 or Mixed IPv4/IPv6
network

Transaction Log detail

ARCHITECTURE FOR MOBILE IPV6 APPLICATIONS OVER IPV4

CROSS-REFERENCE TO RELATED APPLICATION

This patent application claims the benefit of U.S. provisional application 60/596,077, filed Aug. 29, 2005, which is incorporated by reference along with all other references cited in this application.

BACKGROUND OF THE INVENTION

The present invention relates generally to networking and Internet protocol communication and services and, more specifically to facilitating secure Mobile Internet Protocol version 6 communication services over an Internet Protocol version 4. The invention also includes a new application development environment which simplifies the development of new services for portable computing devices (e.g., PC, PDA, and smart phones).

Data networking has been one of the most successful and widely adopted technologies of the information age. Computers and devices may "talk" to each other and transfer data through the network, which in turn facilitates electronic commerce, the Internet, and much more.

There are currently two versions of internet protocol in use: the existing Internet Protocol version 4 ("IPv4") and a new Internet Protocol version 6 ("IPv6"). IPv6 is expected to gradually replace IPv4, but the two versions will coexist for a number of years during the transition period. Thus, enabling IPv6 communication over an IPv4 network during the transition period when the two versions coexist is an important concern among users of the Internet.

One of the primary drivers in the deployment of IPv6 is that it enables improved device mobility over IPv4. Currently mobility in IPv4 (also known as Mobile IPv4) requires the deployment of special hardware know as "foreign agents" in every network that a user might roam into. Subsequently the high cost of adding Mobile IPv4 features to existing networks has been a barrier to deployment. Conversely IPv6 supports device mobility without the need for special hardware as the mobility features have been incorporated into the protocol itself. Unfortunately the deployment of native IPv6 networks is quite limited.

Despite the success of networking, there is a need to improve network technology, especially secure networks so data may be securely transmitted from one point to another point in a network. And it is desirable that this secure network is easy for a user to set up. Therefore, there is a need to create a secure, easy-to-use end-to-end persistent connection between portable computers and networked appliances.

BRIEF SUMMARY OF THE INVENTION

To address the dilemma of leveraging the benefits of mobile IPv6 in an IPv4 network, a system and method of operation referred to as PIANO (for Portable Internet Architecture as a Network Overlay) is presented. Mobile clients can execute IPv6 applications in an IPv4 environment without the need for any specialized IPv6 hardware or upgrades to the network infrastructure. The architecture provides a seamless, disruption-free connectivity experience for mobile clients. Mobile clients are automatically connected to other mobile clients irrespective of their network connectively, whether wireless, wire line, IPv4, IPv6, public or private. Mobile clients communicate with other mobile clients using a secure, end-to-end IPv6 tunnel. This creates a persistent VPN connection between two clients using software.

The invention provides an end-to-end virtual private network (VPN) architecture and application framework. In an implementation, a virtual private network service is designed to create a secure end-to-end persistent connection between portable computers and networked appliances. The network establishes a secure end-to-end connection without the need for VPN or IPsec gateways to establish the connection, thus enabling an end-to-end secure connection that is persistent and works over firewalls and network address translations (NATs). The network achieves secure end-to-end connectivity by using a secure IPv6 tunnel over IPv4-based Internet networks and also over IPv6 networks. The system allows for mixed environments. The IPv6 tunnel enables files to be transferred or Internet services to be activated for any Internet connected location.

The invention provides methods for deploying and developing mobile IPv6 applications in IPv4 networks. The mobile IPv6 application is able to operate in a native IPv4 network without the existence of any IPv6 routers or special network devices. Many standard mobile IPv6 features such as route optimization (direct client-to-client connectivity) and nomadic roaming (moving without losing IP connectivity) usually available in IPv6 networks are available in the IPv4 network. Additionally the method also has provides new features that improve security (by restricting the distribution of addressing information through the creation of private user groups) and simplifies application development (by new APIs) for mobile IPv6 applications.

In an embodiment, the invention is a method including: providing a home agent server, connected to an IPv4 network, managing a plurality of groups of IPv6 clients; providing a first IPv6 client and second IPv6 client connected to the home agent via the IPv4 network, where the first and second IPv6 clients are in a first group; from the first IPv6 client, sending to the home agent an IPv4 address and IPv6 address associated with the first IPv6 client; from the second IPv6 client, sending to the home agent an IPv4 address and IPv6 address associated with the second IPv6 client; when the first and second IPv6 clients are connected to the home agent server, implementing a first IPv6 tunnel in the IPv4 network between the first IPv6 client and the second IPv6 client; and from the first IPv6 client, transferring data in an encrypted form using the first IPv6 tunnel directly from the first IPv6 client to the second IPv6 client, where the data does not pass through the home agent server.

In an implementation, the first client implements the first tunnel without using the home agent server. The first client is typically software or an application running on a computer, PDA, phone, or other electronic device. During a binding update procedure, the home agent disseminates to all the clients within a group the IPv6, public IPv4, and private IPv4 info for every connected client in the group. Using this information, a client can create the IPv6 tunnel to connect to other clients in the group. From this information, the client can determine whether firewall such as NAT firewalls are present take the necessary actions to make a connection. A direct end-to-end connection between a sending and receiving client is desired, but sometimes not possible, perhaps because of a firewall. Then, a connection between the sending and receiving clients may be reflected using the home agent server. Since the client attempts to implements the tunnel and does not involve the home agent server (except in the reflection situation), the home agent is subject to less processing burden, freeing up the home agent to handle other tasks. In fact, two clients may be connected together and the home agent would not necessarily know of the connection.

The home agent server also has a cache so that then the second IPv6 client becomes disconnected from first IPv6 client, the first IPv6 client will recognize this and implement a second IPv6 tunnel in the IPv4 network between the first IPv6 client and the home agent server. Even though the second IPv6 client is no longer on-line, the first IPv6 client will continuing transferring the data in the encrypted form using the second IPv6 tunnel to a data cache at the home agent server. The data will be held in the cache for the second IPv6 client. So when the second IPv6 client is connected again and performs a binding update with the home agent, the data in the cache from the first IPv6 client is send to the second IPv6 client using a third IPv6 tunnel. The data remains encrypted the entire transmission path and while it resides in the cache. The home agent does not decrypt the data. This enhances security and reduces processing burden on the server. By providing a cache, data may be transmitted or streamed regardless of whether clients are on-line, thus enhancing the reliability of the network and data transmission.

The home agent has additional security by dividing the clients into different groups. These groups may be called closed user groups. Clients within a group may be aware and connect to each other. However, clients of different groups do not know about each other. Furthermore, operations such as a binding update and commands such as PUBLISH (described below) will only disseminate information only to clients within the same group. A client may be a member of one or more groups.

Upon connecting to the network, a client performs a binding update with the home agent. During the binding update, the client sends its IPv6 address and private IPv4 address (IPv4 address the client knows about) to the home agent. The home agent know the public IPv4 address of the client. The home agent disseminates the IPv6, public IPv4, and private IPv4 addresses to all the clients within the group. In some implementations of a binding update, the client may also send a cookie to the home agent for authentication purposes.

Based on information received during binding updates, each client can initiate connections with other clients in the same group. The information from the binding update may be used by a client to determine whether it is behind a NAT firewall or a receiving client is behind a NAT firewall. If both sending and receiving clients are behind the same NAT firewall (i.e., have the same public IPv4 address), then the clients can connect using the private IP addresses. If one of the clients that is to be connected is behind a NAT firewall and the other is public, the "public" client will make a connection to the "private" client. And if both clients are behind different NAT firewalls, then the clients will reflect off the home server.

In an end-to-end connection, data is transmitted directly using a tunnel from a sending client to a receiving client directly. The data does not pass through the home agent. Reflecting off the home agent server refers to passing data from the sending client to the receiving client through the home agent server. The data will be encrypted as if the connection where an end-to-end connection. Data will remain encrypted as it is passed through the home agent. The home agent does not decrypt and reencrypt the data, thus maintaining lower processing overhead.

An aspect of the invention is that the applications running on each client may be IPv6 applications and the client facilitates execution of these IPv6 applications in IPv4 network. To the applications, they are unaware they are working in an IPv4 environment. As far as the application is concerned it is operating in a pure IPv6 environment. The architecture of the invention including the home agent, client software, binding update, and other features facilitate operating the ability to run IPv6 applications in IPv4. Furthermore, the architecture also allows hybrid environments. For example, some clients to the home agent may be in a pure IPv6 environment and other clients are in an IPv4 environment. The home agent of the invention permits connectivity between clients in different environments.

In an embodiment, the invention is a method including providing a home agent server, connected to a number of clients organized in groups, all connected in a network; providing a set of commands including a PUSH command to transfer data from one of the clients in one group to another client in the same group, a PUBLISH command to show clients in one group files available to other clients in the same group, and a PULL command to request sending of at least one file made available through the PUBLISH command from the client having the file; issuing a PUSH command from a first client of in a first group to transfer data to a second client in the first group; when the second client is connected the network, executing the PUSH command by transferring the data directly from the first client to the second client; when the second client is not connected the network, executing the PUSH command by transferring the data to a data cache on the home agent server; and when the second client connects to the network, transferring the data from the data cache to the second client.

An implementation of the invention may have one or more of the commands, PUSH, PULL, and PUBLISH, in any combination. PUSH is a command that may be used by an application to make a connection to another client. PUBLISH is a command that may be used by an application to publish or make know to other clients with a group the files that are available on the publishing client. For example, the publishing client may share one or more files or even an entire directory. PULL is a command to request a file from another client. For example, one client may want a file that has been published by another client. Then this client issues a PULL command to obtain the file. In an implementation, the PULL command may invoke a PUSH command from the publishing client. The commands may be cached when a client is off-line.

In an aspect, the invention is designed to create a secure end-to-end persistent connection between mobile, fixed computers and other networked devices leveraging mobile IPv6 client-server software over existing IPv4 networks.

In an aspect, the capabilities of the architecture supports a persistent end-to-end relationship between any two authorized clients, and thus supports session roaming from Wi-Fi to Wi-Fi and Wi-Fi to WiBro or WiMax, without the need for switching equipment.

In an aspect, the invention provides a secure virtual private network environment for a range of consumer, SoHo, enterprise, and government applications. PIANO establishes an end-to-end connection without the need for IPsec gateway equipment in the middle, enabling end-to-end services that are secure, persistent, and easy to use.

In an aspect, the invention is also an application framework. With simple application programming interfaces (APIs) or utilizing native IPv6, software developers can take advantage of the persistent connectivity between portable computing devices to port existing services or create new services.

In an aspect, an agent of the invention allows standard IPv6 and mobile IPv6 applications to run in an IPv6 environment. Features of mobile IPv6 such as route optimization are supported. Mobile clients (also known as mobile nodes) of the invention will connect to other PIANO clients. Voice over Internet Protocol or VoIP services will connect to the public switched telephone networks (PSTNs) both wired and wireless through a standard VoIP gateway.

Other objects, features, and advantages of the present invention will become apparent upon consideration of the following detailed description and the accompanying drawings, in which like reference designations represent like features throughout the figures.

DETAILED DESCRIPTION OF THE INVENTION

The invention provides an end-to-end virtual private network (VPN) architecture and application framework. A specific implementation of such a network is the "Portable Internet Architecture as a Network Overlay" or "PIANO" from PIANO Networks. Although this patent describes the invention with respect to a specific implementation, PIANO, the invention may be embodied in other implementations and applications. Other implementations may include one or more of the aspects of the invention, and may not include each and every feature described for the PIANO implementation.

PIANO is a virtual private network service designed to create a secure end-to-end persistent connection between computers, and between computers and networked appliances. PIANO establishes a secure end-to-end connection without the need for VPN or IPsec gateways to establish the connection—thus enabling end-to-end secure connections that are persistent and work over firewalls and network address translation gateways (NATs).

PIANO achieves secure end-to-end connectivity via the novel use of secure IPv6 tunnel over existing IPv4-based Internet networks. The IPv6 tunnel enables files to be transferred (e.g., picture, documents) or Internet services to be activated (e.g., voice over IP) for any Internet connected location. PIANO also facilitates the integration of IPv6 devices or IPv6 networks, or both, with existing IPv4 based networks and clients.

In addition to being an end-to-end VPN service, PIANO is also an application framework. Via new simple application programming interface (API) commands, software developers can take advantage of PIANO's secure connectivity to create new services such as GUI-based content distribution. GUI stands for graphical user interface.

PIANO provides a unique secure end-to-end VPN framework for a range of consumer, Small Office/Home Office (SoHo), enterprise, and government applications:

Consumer and SoHo: Content management, file sharing, and data back-up services between mobile laptops and desktops over Cable, DSL, or satellite Internet connections.

E-commerce: Persistent secure connections for consumer access to e-commerce sites to enable trusted access (on-line banking, brokerage accounts, and others).

Enterprise: Secure end-to-end VPNs to permit secure extranets and secure free end-to-end services such as file sharing, content distribution, VoIP, and voice conferencing, data back-up for laptops via secure persistent logical connection.

Government: IPv6 transition service to enable deployment of applications across new IPv6 and legacy IPv4 networks.

Architectural Overview

Figure 1:
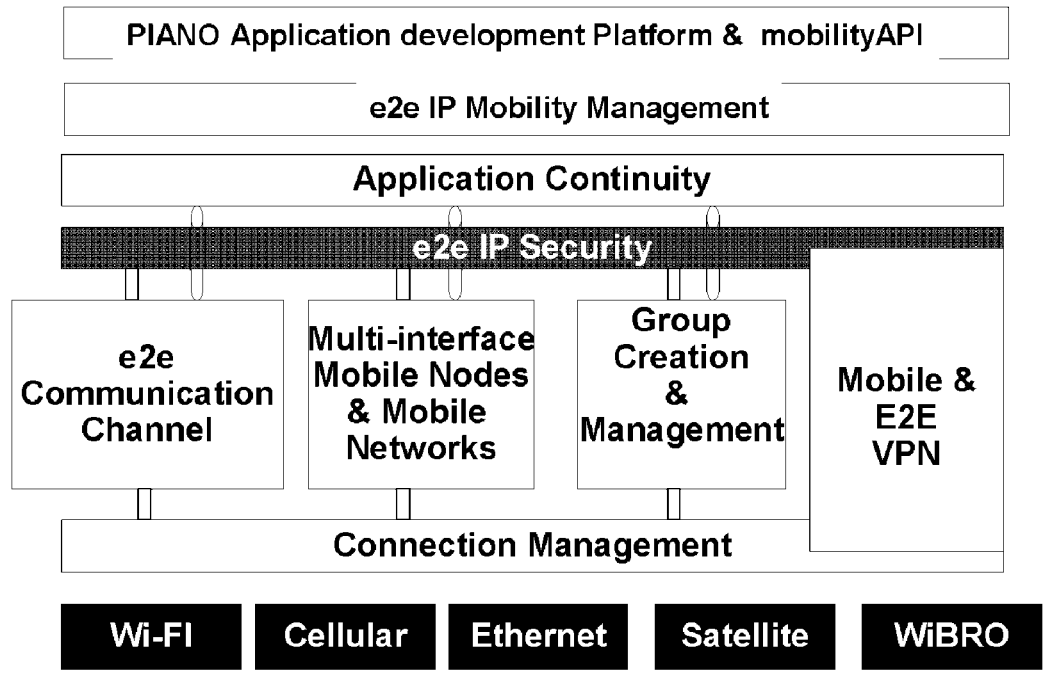
FIG. 1 shows a high level overview of architecture of the invention.

FIG. 1 shows an overview of an architecture providing support for IPv6 and mobile IPv6 applications over an IPv4 network. A specific implementation of this architecture is the PIANO architecture and is discussed merely to provide an example of the invention. Other implementations of the invention may incorporate some of the features of discussed for PIANO and may include additional or different features. Using the PIANO architecture, the IPv6 applications execute in an IPv4 environment, and they may be completely unaware they are operating in the IPv4 environment.

The PIANO architecture is formed by the incorporation of key components. The PIANO glue logic allows the enablement of all these components into a novel approach for secure, mobile end-to-end, peer-to-peer communications.

Figure 2:
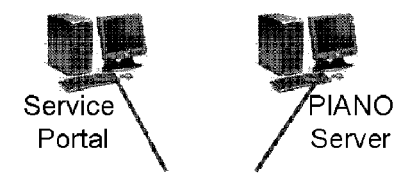
FIG. 2 shows the new idea of having a service portal cofunctioning with a mobility server.

FIG. 2 shows a service portal functioning with a home agent server (e.g., PIANO mobility server). These can reside as separate entities or coexist physically together. The service portal will allow for service initiation and registration. It will provide the end devices IPv6 address space and allow for account creation, modification, and deletion. Together with the PIANO mobility management server entity, group creation is tightly coupled on top of the mobility plane. A specific implementation of the invention provides a tight coupling of the mobility plane with group creation and management by using a service portal and PIANO server. However in other implementation, there may be a different configuration of the logical components of the architecture.

Figure 3:
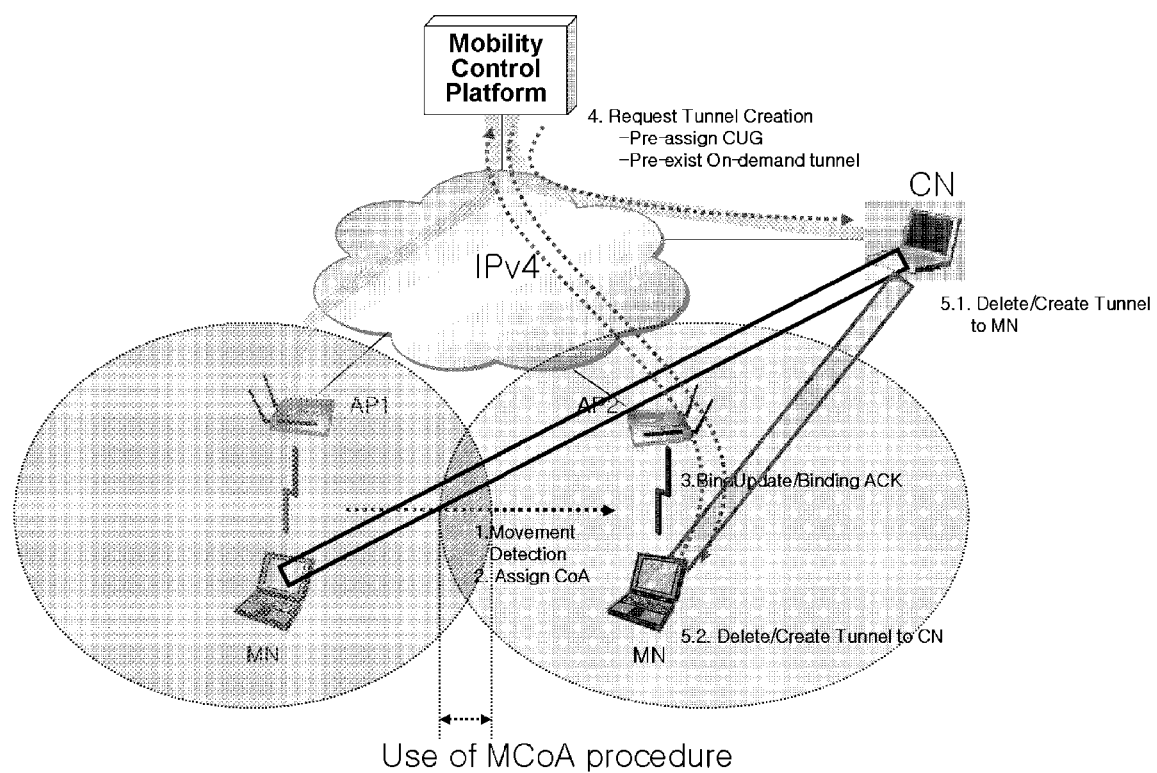
FIG. 3 shows a detailed overview of a mobility control functionality.

FIG. 3A shows a detailed overview of the PIANO mobility control functionality. Here on-demand end-to-end mobility tunnels are created, updated, and deleted based on the movement of the PIANO clients. Tunnel creation from one PIANO client to another must be authorized by first determining if this client node is able to setup an end-to-end tunnel with this particular peer. One this decision is made, a tunnel may be setup or in the case of it is not valid to carry out this operation, a rejection message for this service is made. The tunnel may be optionally secured at various levels.

Figure 4A:
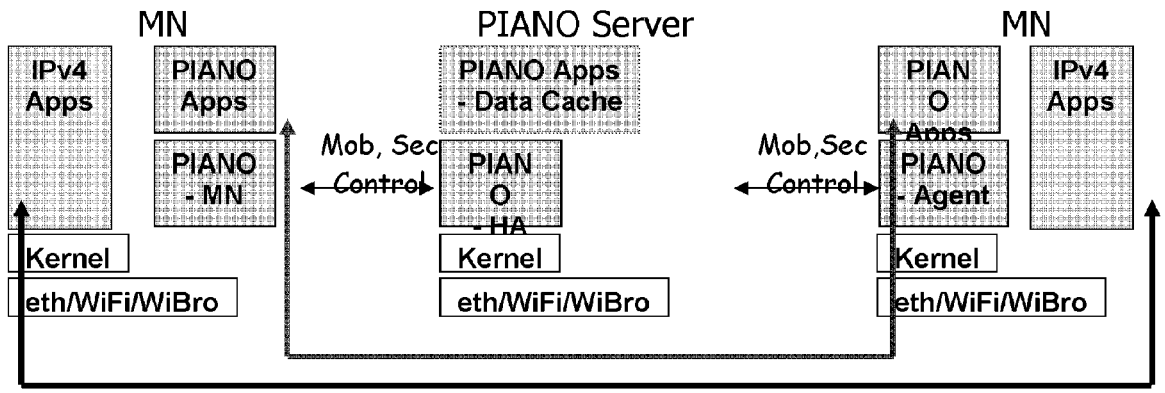
FIG. 4A shows a block diagram of system with a home agent server and two clients.

FIG. 4A shows a more detailed block diagram of system with a home agent server (i.e., PIANO server) and two mobile clients, which are sometimes referred to mobile nodes (MN).

The PIANO architecture includes two components:

(1) A PIANO client (which may be referred to as a mobile client) resides in a networked computer such as a laptop, desktop computer, server, personal digital assistant (PDA), or smart phone. The client may also be a networked appliance like a storage server, a Wi-Fi enabled digital camera, or cable or DSL CPE modem. The PIANO client is identified via a unique IPv6 address that is used to connect to other PIANO clients via IPv6-over-IPv4 tunnels. In addition to creating secure end-to-end tunnels with other PIANO clients, the client supports an application programming interface (API) and native IPv6 interface for IPv6 applications.

In a specific implementation, the mobile client is implemented using software, but in other implementations, the mobile client may be implemented in firmware or hardware. As shown in FIG. 4A, when operating in an IPv4 environment, the IPv6 applications (i.e., PIANO applications) interface from the mobile client application (i.e., PIANO MN), while IPv6 application can interact directing to the network. To make an end-to-end IPv6 connection in the IPv4 environment, the IPv6 application use agent and client software of the two clients. Also, the home agent server sends and receives information to facilitate IPv6 connections under IPv4 to the mobile clients.

The PIANO client functions include: (i) Internet connection monitor to initiate and maintain the PIANO network IPv6 connection and its associated IPv4 "care of address"; (ii) mobile IPv6 based client to manage IPv6 mobility and end-to-end (or peer-to-peer) connections; (iii) graphical user interface to activate and manage user services; (iv) encryption and decryption of communications with other PIANO clients and control messages with the PIANO server; and (v) PIANO user services such as FTP for file transfers.

(2) A PIANO server (which may be referred to as a home agent server) is responsible for maintaining the database of PIANO client IPv4 addresses. Whenever a PIANO client gets an active IP link it automatically connects to the PIANO server and sends a binding update of its current IPv4 address. The PIANO server then forwards the binding update information to other mobile clients that belong to the group (e.g., family members sharing photos and digital videos).

A system of the invention may include a server or device including one or more of the functions discussed, in any combination. The functions may be implemented using different or separate servers. One or more of the functions may be implemented using software, hardware, or in firmware. The PIANO server may sometimes be referred to as a home agent (HA) server. The functionality of the PIANO server or home agent server includes:

(i) A web server front end to allow new users to register for PIANO services. The web server provides an easy-to-use user interface. The home agent assigns a unit IPv6 address for each mobile client. See below for a further discussion.

(ii) A client authentication directory to maintain the list of authorized mobile clients, and their attributes.

(iii) A home agent component for mobile clients (PIANO clients) provides address resolution for PIANO clients. The home agent is the component of the PIANO server that maintains the directory of authorized PIANO clients or mobile clients, validates their IPv6 address, and detects and records the mobile clients' current IPv4 address. Whenever a mobile client recognizes an active IP link, it automatically connects to the PIANO server's home agent and sends a binding update (BU) with its current IPv4 address (public and private address components) and maintains a record of other attributes for each client device.

The home agent records and maintains a real-time record of the mobile client's IPv4 care of address in addition to the dedicated IPv6 address and the user assigned user ID. A care of address is allocated to a mobile client when the mobile client moves its attachment point to a different subnet.

This allows other mobile clients to search and locate the mobile clients to set up an IPv6 tunnel for services.

A binding update occurs when a mobile client connects to the network. During a binding update operation with the home agent, a mobile client sends the home agent its IPv6 address and IPv4 address. This IPv4 address may be referred to as a private IPv4 address because this is the IPv4 address the client itself has been assigned. This may not be its public IPv4 address because the mobile client may be behind a firewall such as a NAT firewall. In this situation, the mobile client typically does know the public IPv4 address it is associated with.

However, the home agent is able to determine the public IPv4 address of the mobile client. As part of the binding update, the home agent provides the IPv6 address, private IPv4 address, and public IPv4 address to other clients in the same group. The mobile clients can use this information to make end-to-end and other connections, without needing to involve the home agent. This reduces the processing overhead required by the home agent, so a home agent can handle more mobile clients.

In a specific implementation, during the binding update, the mobile client also sends a cookie to the home agent, which is used to help authenticate the mobile client. This cookie was provided to the mobile client upon the setting up of the account. This cookie is typically an encrypted file or message that is stored at the mobile client. If the cookie does not match what the home agent expects for that particular mobile client, there is a potential security violation and the home agent will disallow further access to its network by the mobile client.

(iv) An IPv6 router. The PIANO server forwards traffic between IPv6-over-IPv4 tunnels without needing to decrypt the IPv6 payload. Data is "reflected" or "bounced" off the home agent server. This reflection function provides the connectivity for PIANO clients when a route-optimized direct end-to-end tunnel cannot be established. In other words, when a direct end-to-end connection is not available, the data is sent from a sending client to the home agent, which forwards the data on to the receiving client.

Furthermore, this router forwards traffic between IPv6-over-IPv4 tunnels without needing to decrypt the IPv6 payload. Operations such as encryption and decryption are typically processing and compute intensive. Since the architecture of the invention permits data to be transmitted in its original encrypted format, the home agent has relatively less processing overhead. This allows a home agent to handle many more clients than if the home agent had to decrypt and encrypt data when transferring data between clients.

(v) The PIANO server provides caching for occasions when a file is sent to a destination PIANO mobile client that is off-line. This cache to stores data temporarily, until the receiving client comes on-line or becomes reconnected the network. In an implementation, this cache resides on the same system as the home agent. However, in other implementation, this cache may be on a different or separate system. For example, this cache may reside on a different server, hard disk, memory, network attached storage (NAS) device, or other.

More specifically, when a mobile client sends a file, its buddy list information (received from the PIANO server) will tell it that the receiving node is off-line, so the file will be sent to the PIANO server. When the target receiving node comes on-line, and announces itself to the server via a binding update, the PIANO server sets up a tunnel to the destination receiving node, and the file transfer is completed. The PIANO cache will retain a copy of the file until transfer to the receiving node is completed. Thus if the transfer is interrupted (receiving client goes off-line), the transfer will continue on when the receiving client comes back on-line.

This feature provides additional reliability to the system. In a mobile environment, the network connectivity is often poor and so clients are losing and reestablishing connectivity to the network. For example, the user may be walking from one Wi-Fi location to another location. The caching feature of the invention allows data to be sent by the sending client without needing the receiving client on-line. The receiving client may be off-line at the start or at any time during the transmission. The data will be sent to the home agent cache and stored there until the receiving client connects. Then, the data will be delivered to the receiving client.

Similar to the situation when reflecting data off the PIANO server, when using the cache feature, the communication between the mobile clients is secure. The data will remain fully encrypted from the sending client to the server, and from the server to the receiving the transmitted data. The server does not decrypt the data, but rather the data is stored in the cache in an encrypted format.

The communication between the mobile clients is secure because the will the data will remain fully encrypted from the sending client to the server and from the server to the receiving the transmitted data. The server does not decrypt the data, but rather the data is stored in the cache in an encrypted format.

(vi) Authorization, billing, and management server to set up new groups or add or delete individual users from a group. Administration and management web server access to monitoring statistics and fault analysis.

Piano Operation

Figure 4B:
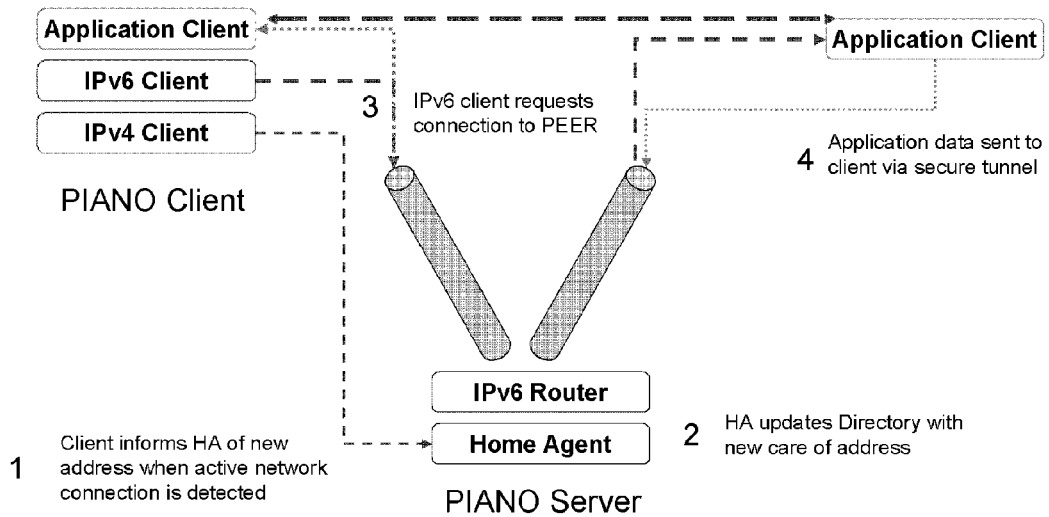
FIG. 4B shows operation of a network according to the invention.

FIG. 4B shows operation of a network according to the invention. More specifically, the figure shows PIANO, a specific implementation of the invention.

Referring to reference number 1 of FIG. 4B, when the PIANO client detects an active IP connection it sends a tunnel set-up message to the PIANO server. The server uses the message to determine the source IPv4 and UDP port address of the client.

Referring to reference number 2 of FIG. 4B, the PIANO server updates its directory with the new public and private IPv4 address and source UDP port of the client. The server also updates the client with any new group information (i.e., add or delete plus current IPv4 address).

Referring to reference number 3 of FIG. 4B, the PIANO server informs the clients' group members of the new location of the client by forwarding an encrypted binding update message with the public and private IPv4 and UDP port address.

Referring to reference number 4 of FIG. 4B, the PIANO clients set up secure IPv6 over IPv4 end-to-end tunnels with other clients in their group. The PIANO clients have a route optimization feature that creates a direct end-to-end tunnel if one or both clients have a routable address. If both clients are in the same private network, the clients will use the private address to make a direct connection.

If the two clients are on different private networks, however, then the traffic will reflect off the PIANO server. Note that even if the traffic is reflected off the PIANO server, the tunnel is encrypted on an end-to-end basis.

Tunnel Set-Up Message

To establish secure tunnels between the PIANO client and the PIANO server, a new type of tunnel establishment message is used. The information contents of the message help validate the client as well as provide the server the necessary information to send binding updates to other clients to enable end-to-end communications. The client sends an IPv4 UDP message containing the following elements to the PIANO server:

(1) IPv6 address;
(2) IPv4 address;
(3) UDP port number; and
(4) cookie.

Note that the message payload may be encrypted for added client security. Once the server receives the message, then the server:

(1) Checks the cookie and IPv6 address match. The server will then acknowledge message receipt via return cookie to the source IPv4 address.

(2) Compares the source IPv4 address and transmitted address to determine if the client is in a public or private network.

(3) If the server receives multiple set-up messages from the same IPv4 address, it then uses the source UDP port number to distinguish multiple clients operating in the same private network.

The server uses the information in the tunnel set-up message to (1) establish a secure tunnel with the client and (2) send a binding update to the clients group so that they may establish route optimized end-to-end link.

The tunnel set-up message is initiated when client devices are turned on as well as when IP changes are detected (e.g., user walking with Wi-Fi PDA). Consequently, PIANO enables nomadic mobility and roaming over both public and private networks.

Architectural Details

Standards govern IPv6 and IPv6 over IPv4 tunnels. The PIANO architecture further has in addition to the standards: (1) logic to enable end-to-end data transfers without the need to reflect off of a server, and (2) a type of data cache to facilitate data transfer between clients that may not be simultaneously on-line.

IPv6 Route Optimization Over IPv4 Networks

Figure 5:
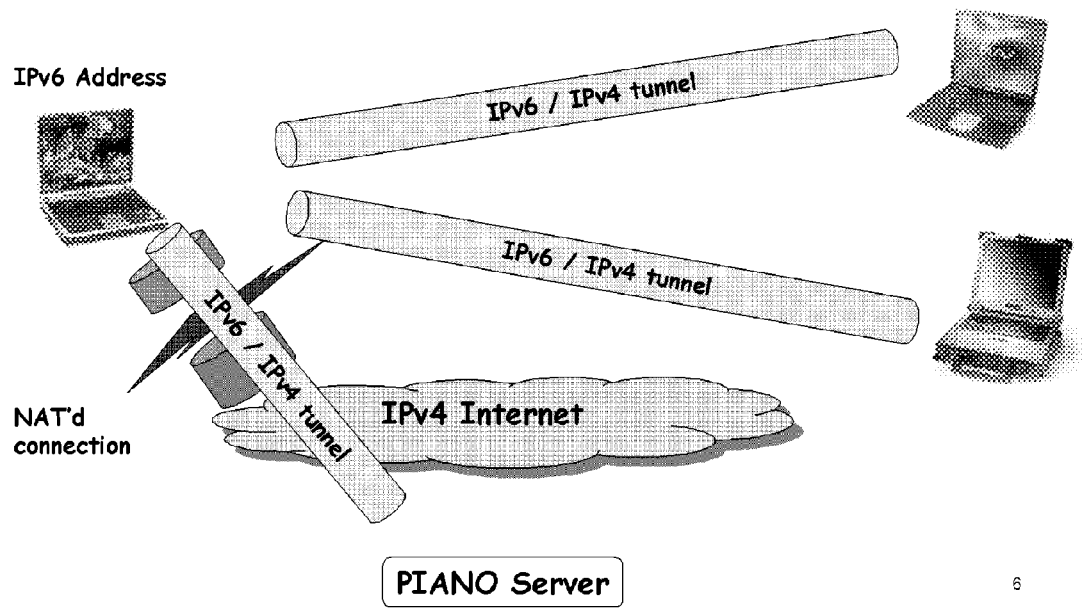
FIG. 5 shows operation of IPv6 route optimization over IPv4 networks.

FIG. 5 shows the operation of IPv6 route optimization over IPv4 networks. To enable end-to-end data transfer with a topologically optimal network, the PIANO clients execute route optimization over IPv4. When PIANO clients connect to the PIANO server they get an update of the location of their group clients. This binding update format, contains the IPv6 address, private IPv4 address, and public IPv4 address and source UDP port address. The client then attempts to establish a secure end-to-end tunnel with the other clients within the same group using the addressing information.

If one or both PIANO clients have a routable IPv4 address, a secure end-to-end tunnel is established using the public IPv4 address. In situations where both clients are behind the same NATs, then a secure end-to-end tunnel is established using the private address. If the clients are in different private networks then the traffic is reflected off the server. However, even in the case where the tunnel is reflected (i.e., clients behind different NATs), the encryption is still end-to-end as the server forwards the packets without terminating the tunnel.

To mitigate the risk of a denial of service (DOS) attack on clients, control data is sent via a secure channel reflecting off the server (to determine authenticity).

Dynamic Data Caching

Figure 6:
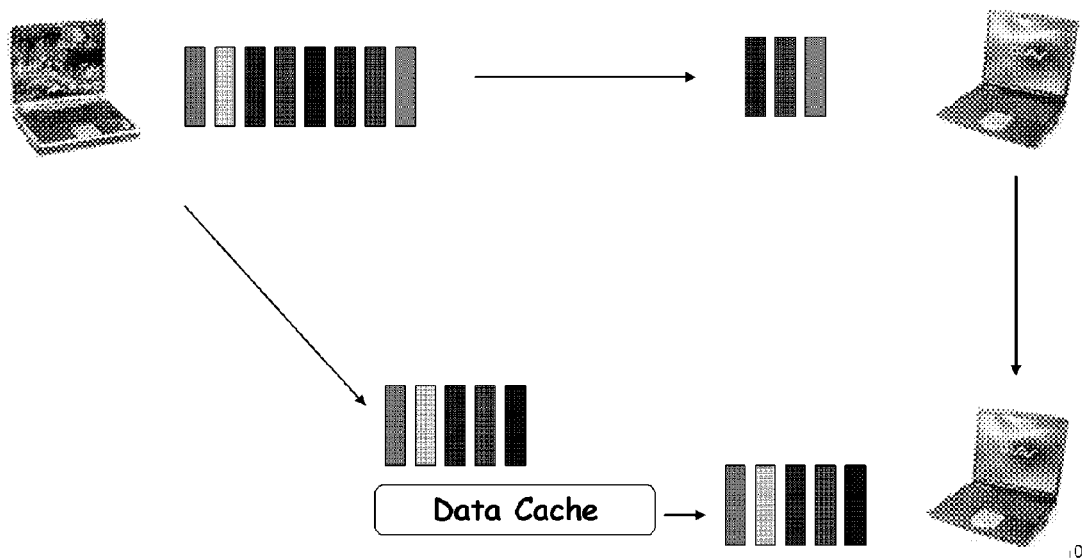
FIG. 6 shows a dynamic data caching operation.

FIG. 6 shows a dynamic data caching operation of the invention. To facilitate large content transfers between clients that are not on-line simultaneously the PIANO server has incorporated a data cache. PIANO clients continually get binding updates from the server of the location of group users. Thus when clients wish to send data, they first check their local binding cache to establish an end-to-end route optimized connection. If that fails, the clients then attempt a reflected connection off the server. If that fails, data cache accepts the IPv6 packets.

Unlike previous caching solutions, the PIANO data cache stores the entire IPv6 packet stream, complete with secure payload. Thus when the destination client comes on-line, IPv6 packets are automatically forwarded on the secure control channel. As the data caching solution does not require signaling to either accept or forward packets, it can handle large numbers of mobile users. Moreover, since end-to-end encryption is used for the payload, content stored at the data cache is secure. There is no capability to decrypt the content at the data cache.

PIANO Application Framework

Figure 7:
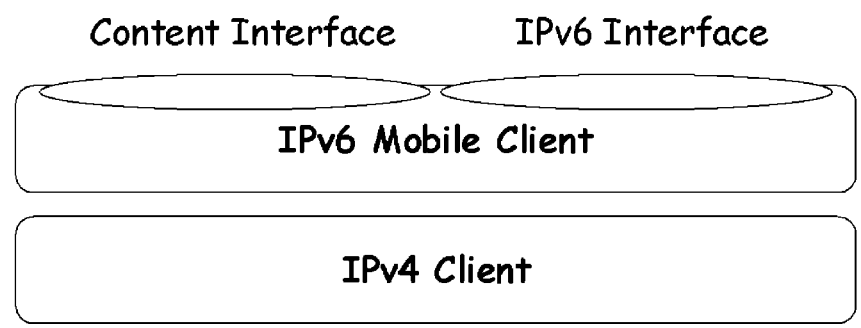
FIG. 7 shows an application framework.

In addition to providing secure connectivity between PIANO client, PIANO also provides an application framework. FIG. 7 shows an application framework of the invention. PIANO clients have two types of programming interfaces.

As a first interface, PIANO has a content interface that enables the distribution of data to one or more clients. The commands for the content interface include:

PUSH: sends a file to one or more clients. The PUSH command leverages the secure end-to-end connectivity to deliver content directly to the destination client. Should the destination client be off-line, the client automatically sends the file to the data cache for later forwarding.

PUBLISH: sends an index of files along with thumbnails available for remote download to one or more clients. Similar to PUSH, should destination clients be off-line, the index is stored on the cache for later pick up.

PULL: enables clients to remotely download PUBLISHED content from a remote client. PUBLISH sends a PUSH command to itself to the destination node.

As a second interface, PIANO offers a clear channel IPv6 interface that enables transparent IPv6 over IPv4 operation. The IPv6 interface hides the IPv4 network from the application and also re-creates all of the standard features found in an IPv6 network (e.g., DHCP messages).

With PIANO, user clients as well as IPv6 devices appear static; their location and movement on IPv4 is hidden. For example, when using the PUSH command to send content from one device to another, the application does not have to worry about security, Firewall or NAT traversal, or even if the destination device is on-line. Similarly, IPv6 application developers can create and deploy software without worrying about 6-over-4 tunneling or binding updates for mobile devices.

With the PIANO approach there is no need to have clients and/or applications to maintain NAT mappings. PIANO provides complete transparency to the IPv6 apps communicating even if behind an IPv4 NAT. As part of the PIANO mobile IPv6 approach no special discovery of transition service or translation will be required.

This approach in its basic form can be viewed as mobile IPv6 over IPv4 (i.e., all of the mobile IPv6 features can be used an IPv4 network). As such, IPv6 network management tools don't have to learn about a new transition protocol simply because they never need to know about the IPv4 network (i.e., it is hidden by PIANO). Special configuration of a transition method in the network is not required with this approach—one only needs to know how to configure mobile IPv6.

PIANO Content Application Examples

Figure 8:
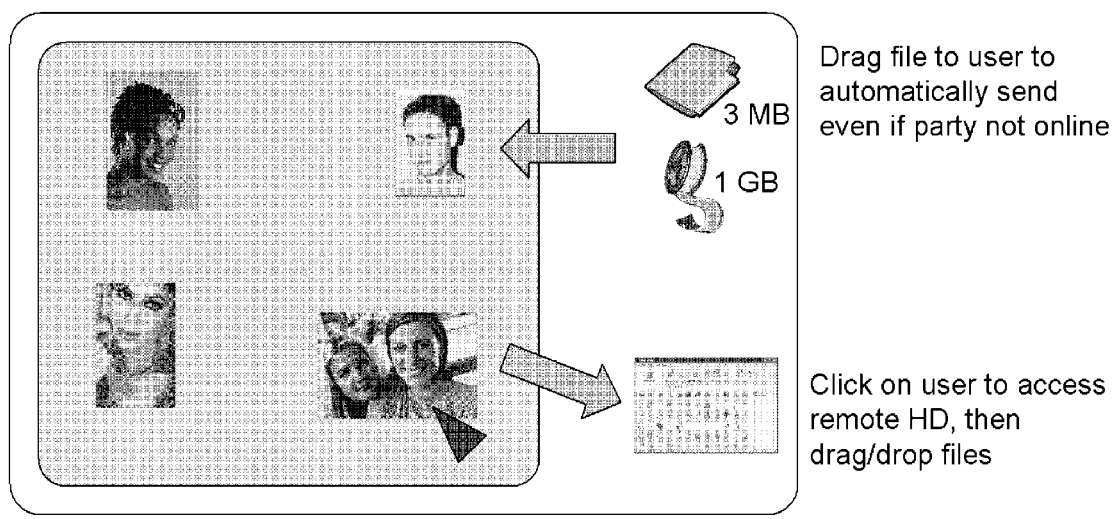
FIG. 8 shows a graphical user interface for network content applications.

FIG. 8 shows a graphical user interface (GUI) for network content applications. In particular, there is GUI-based content distribution, publishing, file synchronization, and hard disk back-up.

Some personal file sharing solutions are either e-mail based (or use embedded e-mail clients) for small files (such as digital pictures or documents) or tools like FTP for large files (like digital videos), which require the destination device to be on-line. With PIANO, users can move arbitrarily large amounts of content even if the sender or receiver, or both, are off-line during transfer initiation. Application developers can take advantage of PIANO's features to create new GUI based services.

For file sharing, a user drags the file (such as a Microsoft PowerPoint file or 1 gigabyte movie) to the icon of the destination user. The PIANO client then leverages the PUSH command to send the file to one or more destination devices.

For content publishing, a user can also send an index of content available for download by leveraging the PUBLISH command. Destination clients can view thumbnails of the content by clicking on the icon of the sender. Users can then drag the file on top their desktop which activates the PULL command.

For file synchronization, shared files can automatically be synchronized across multiple PIANO clients by combining a DELTA or SNAPSHOT back-up algorithm with the PUSH command. Thus whenever the original document gets modified, an updated is automatically PUSHed to all mobile clients that have received an earlier copy.

For hard drive back-up, in addition to dragging individual files, user can also drag an icon of an entire directory or device image to the icon on another device and PIANO will transmit all the data. PIANO can also run file synchronization as an option to ensure that user devices are fully backed up till the last time they had an IP connection.

Networked Appliances

In addition to running in open user devices like PCs or PDAs, PIANO clients can also be embedded into devices.

Figure 9:
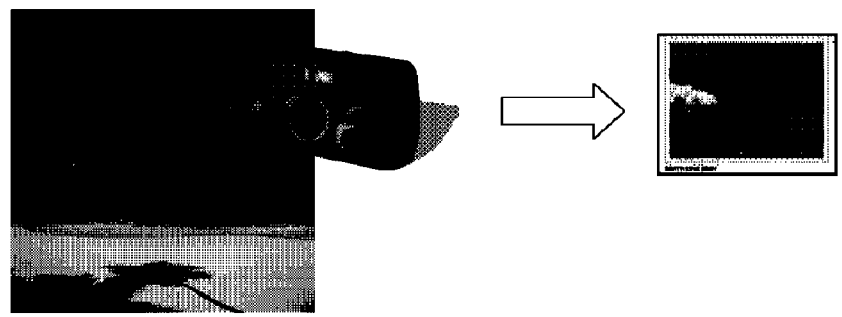
FIG. 9 shows an example of digital content distribution.

For example, referring to FIG. 9, for digital content distribution, by embedding a PIANO client inside a Wi-Fi-enabled digital camera, photos can automatically be delivered to other users when walking past a hot spot. Further, a client could also be embedded into a Wi-Fi digital picture frame, thus enabling a digital photo to be delivered right from the capture device into a viewing device at a remote site.

To send photos, users would simply select which images they wish to send and then the PIANO client would leverage the PUSH command to transmit the file. Users could also PUBLISH all of their photos to a distribution list. Destination clients would receive a thumb nail of the image which they could then PULL down from the camera.

Figure 10:
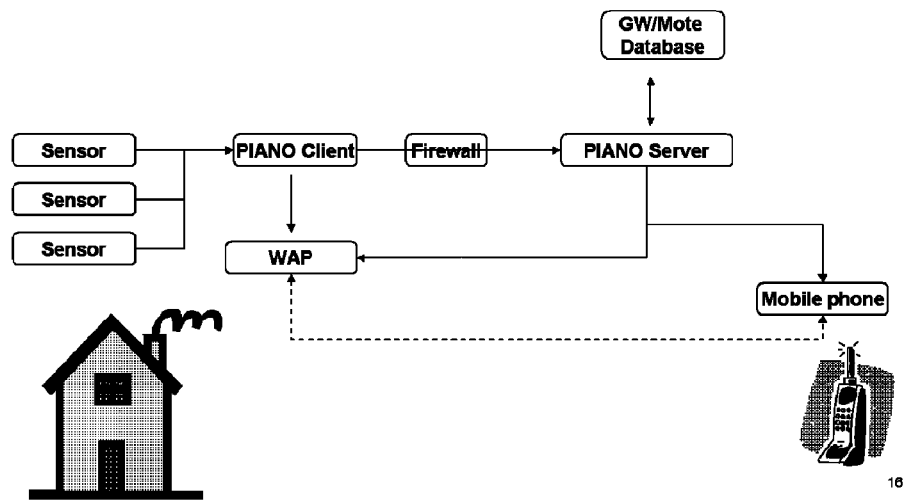
FIG. 10 shows an example of sensor networking.

FIG. 10 shows an example of sensor networking. For sensor networking, PIANO clients can also be used as network gateway for devices that do not have IP connectivity. For example, sensor networks that leverage either proprietary or standards based on 802.15 protocols could locally connect to a PIANO client embedded into a gateway. This gateway could PUSH sensor data to a remote management device or distribute control commands to the sensors from any Internet connection.

Transparent IPv6 Over IPv4 Operation

Figure 11:
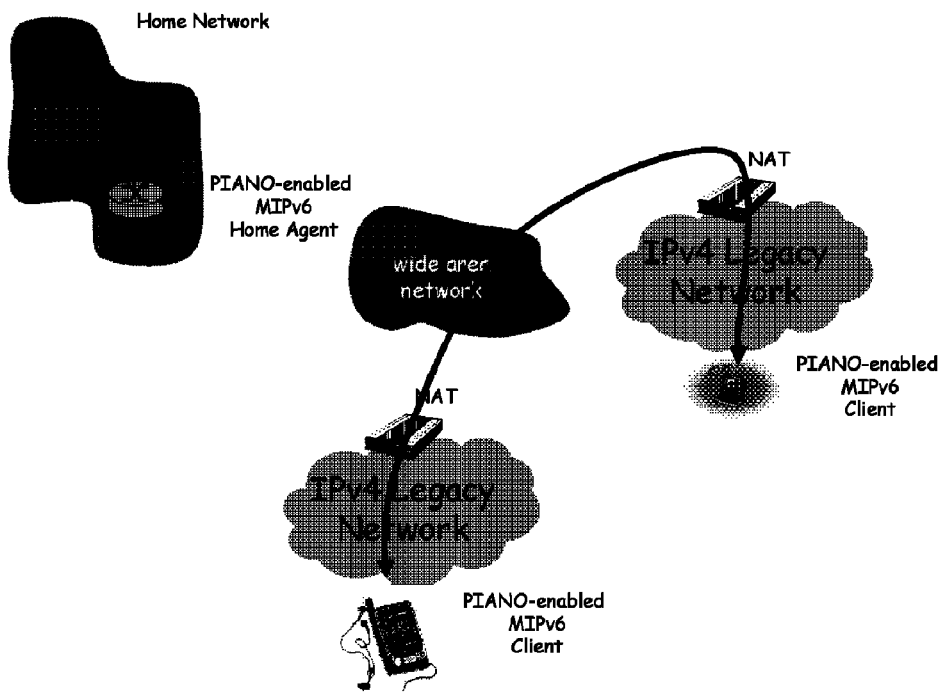
FIG. 11 shows transparent IPv6 over IPv4 operation.

In addition to supporting content distribution and networked appliance applications, PIANO can also be used by IPv6 application developers who would like to deploy their software on IPv4 networks. By leveraging the IPv6 interface of the PIANO client IPv6 applications can connect to application servers with complete transparency and over IPv4 NAT'ed links. See FIG. 11.

With the PIANO approach, there is no need to have clients or applications, or both, to maintain NAT mappings. PIANO provides complete transparency to the IPv6 apps communicating, even if behind an IPv4 NAT. As part of the PIANO mobile IPv6 approach, special discovery of transition service or translation will not be required.

This approach in its basic form can be viewed as mobile IPv6 over IPv4 (i.e., the mobile IPv6 features can be used an IPv4 network). As such, IPv6 network management tools do not have to learn about a new transition protocol simply because they need not know about the IPv4 network (i.e., it is hidden by PIANO). Special configuration of a transition method in the network is not required with this approach; knowing how to configure mobile IPv6 is sufficient.

E-Commerce and Service Provider Applications

Personal E-commerce Portal: The PIANO architecture can also be used to create a secure GUI for E-commerce applications. For example, financial services companies could PUSH a users personal stock data as well as information documents and videos into the client. The user could then access the data from within the GUI and PUSH stock transactions which would be sent back to the application server.

Proxy Security Services: While desktop PCs can be secured behind firewalls and virus scanners, this is much more difficult for mobile workers. Enterprises must either back-haul traffic to their facility or continuously attempt to update mobile computers. Both solutions being cumbersome. With PIANO, the web browser is rerouted to the PIANO server via IPv6 over IPv4 tunnel where virus scanners and SPAM blockers are located. The PIANO architecture enables common policy enforcement without the need to back-haul mobile PC traffic to the enterprise.

Metro Wi-Fi/WiMax Mobility: currently service providers use VLAN switches to create mobility for metro Wi-Fi and WiMax users. VLAN switches back-haul traffic to either a central or originating switch. With PIANO, VoIP sessions, for example, would automatically reestablish and route optimize with mobile users and SIP gateways without the need of a VLAN switch. Running on PDAs or small portable computers, PIANO users would experience 3G like services at a fraction of the cost of cellular 3G services. Moreover even if a user roamed right out of the metro network into a private residential Wi-Fi environment, the services would automatically reestablished.

Secure SIP VoIP Communications: Enterprises like peer-to-peer VoIP due to the cost savings but often do not deploy them due to the security concerns as well as Firewall/NAT connectivity issues which sometimes make hotel and hot spot access a problem. Unlike current peer-to-peer VoIP services, PIANO clients identify themselves to users in other groups. PIANO clients know if other clients of their group are on-line, and how to set up a VoIP session. Leveraging PIANO, enterprises can enjoy secure connectivity without risk of voice call interception or eavesdropping. Moreover the route optimization capabilities enable SIP calls to go peer-to-peer, thus eliminating unnecessary back-haul to data centers or transiting unknown third-party computers.

PIANO Server and Client Interaction

In addition to the initial registration of a new client on the web server (also known as a service portal) and PIANO server, the client and server will interact to set-up the IPv6 tunnels between PIANO clients.

Signaling and Message Flow

The home agent is a component of the PIANO server which manages the authorization and address information to allow the mobile clients (e.g., PIANO clients) to connect. The home agent waits for requests from the mobile clients. Following are the four different types of messages: (1) tunnel create requests from the mobile client; (2) binding update from the mobile client; (3) binding cache query from the mobile client; and (4) binding cache query from a diagnostic tool such as the amipdiag tool.

Mobile Client Signaling Flow for Tunnel Creation

The mobile client initializes its internal data structures and tries to create an IPv6-in-IPv4 tunnel with the home agent. To create such a tunnel, it sends a TUNNEL_CREATE request to the server. This is an IPv4 UDP packet that contains the following: (1) IPv6 address of the mobile client; (2) cookie (installed with the PIANO client install); and (3) IPv4 address of the mobile client (to detect NAT).

On receiving this request, the home agent checks to see if the request is valid (checking the appropriate fields in the directory). If it is a valid request, it checks to see if the IPv6 address is valid and also checks to see if the cookie is a valid cookie for this mobile client. If it is valid, then the home agent checks to see if there is a tunnel already set up for this mobile client. If so, it cleans up and creates a new tunnel for the mobile client.

The home agent also checks to see if the IP address contained in the request and matches the one contained in the IP header. If not, it assumes that NAT is present. If a NAT is present, it creates an IPv6-in-IPv4-UDP tunnel, otherwise an IPv6-in-IPv4 tunnel.

In its response, the home agent sends the response (success or failure) code and also whether it detected a NAT. It also generates a new cookie for future requests from the mobile client. This prevents a potential attacker from knowing a single cookie to launch attacks.

When the mobile client receives the response from the home agent it does the validity check for the response message. If it is valid, it records the new cookie and creates the IPv6-in-IPv4-UDP tunnel or IPv6-in-IPv4 tunnel, depending on whether NAT is present or not.

Now, the mobile client is ready to send IPv6 packets as the tunnel is UP. The mobile client also sends NAT keep alive packets to keep the tunnel UP (otherwise, NAT will shut down the UDP flow and packets from the home agent cannot reach the mobile client).

In an embodiment, UDP port number 6100 is used for encapsulating the IPv6 packet in UDP packet. However, in other embodiment, any available port may be used.

Once a user wishes to initiate a service (e.g., the user drags and drops a file on a destination or receiving client folder in the GUI) between his client and another PIANO client, the PIANO client requests a tunnel from the server which then establishes the end to end tunnel between the two clients. Then the application can be initiated.

Binding Updates

Referring to the FIG. 4B, if either of the PIANO clients (labeled as "PIANO" clients in the diagram) detects a change in their IPv4 address, it will notify the PIANO server, which will update its binding cache. The IPv6 link will stay active, and the application will pause and continue after the new IPv4 link has been established (DHCP processes and the like). The IPv4 address would change if the user moved from one Wi-Fi hotspot to another, or if the user's IPv4 address assigned by the ISP changed (many ISPs use a round robin sharing routine and may change assigned IPv4 addresses).

The mobile client sends a binding update (BU) as soon as the tunnel is created. It is a standard mobile IPv6 binding update but has an IPv4 care-of address option. This tells the home agent that it is currently reachable over IPv4. The home agent processes the binding update appropriately (as per RFC 3775) and sends the binding acknowledgement. The binding update itself is transported over the IPv6-in-IPv4 tunnel. If the mobile client was on the IPv6 network, then the binding update would have been sent over IPv6 directly.

The mobile IPv6 client code does not know how the packet is transported. It is controlled by the previous step. In particular, a tunnel gets created if the access network is IPv4 and it is transparent to the mobile IPv6 code. In an implementation, a lifetime is set to five minutes. The mobile client reports binding updates to the home agent every five minutes (this setting can be changed, regardless of whether there are any changes). If the mobile client has an IPv4 address change it notifies the home agent immediately (approximately one second) with the new binding update information. In other implementations, the lifetime may be set to another value.

When the binding update is sent, a user ID is also sent with the update. A maximum of 64 bytes can be given in the user ID. The mipdiag command shows the uUser ID also along with the IPv6 address and makes debugging easier.

End-To-End (E2E) Tunnels

The mobile client supports creating end-to-end tunnels with its receiving node when they both have a public network address, or when both are behind the same NAT. Receiving nodes are sometimes referred to as correspondent nodes (CNs). For all other cases the sending client to receiving client connection is reflected off the PIANO Server. The sending client (and receiving client) periodically checks the home agent to see if the information has changed and if so, updates the tunnel by deleting and recreating it.

Binding Cache Query and End-To-End Tunnel

The mobile client queries the home agent to see whether other listed mobile clients (such as a buddy list) are on-line or not on-line (e.g., whether they have registered a binding update and with the home agent). It does the query by sending an IPv6 UDP query packet (e.g., port number 6100) to the home agent. The query contains the IPv6 address of the peer. The response from the home agent contains the following: (1) IPv6 address of the peer mobile client; (2) public IPv4 address of the peer; (3) private IPv4 address of the peer; and (4) binding cache expiry time.

In one implementation, a periodic timer value is four seconds. However, in other implementations, the periodic time value may have any value. The specific value for the period time value will be selected based on the probability of a user's address changing. As the probability of the user's address will change goes up, the lower the periodic time value should be. For example, if the mobile client is on a wireless network, then the periodic time value may be 1 second, while if the mobile client is on a home network, the periodic time value may be 10 seconds.

This information also explicitly also provides a "presence indicator" as to whether the peer node (e.g., buddy list member) is on-line or not. The folder is highlighted when the buddy is on-line and "grayed" when the buddy is off-line. See GUI section below for the graphical representation of this information. The mobile client maintains the above information for all members of the buddy list.

When the mobile client receives the query information it finds out:

(1) If the public and private addresses are the same for both mobile client and receiving client, then one or both have public IP addresses.

(2) If both have private IPv4 addresses different from their IPv4 public addresses, then if their private addresses are the same, they assume they are behind the same NAT.

In both of the above cases they create the IPv6-in-IPv4 tunnel directly with each other. This way a two-way tunnel is established between the peer mobile clients. Packets flow directly between the mobile clients without home agent intervention.

If one of the above two cases are not valid (one of the pair has a private address, or both have private addresses but they are different), then the tunnel is reflected off the home agent.

The mobile client keeps querying periodically to see if the receiving client's registration changes. If its state changes, it tears down the end-to-end tunnel and rebuilds it based on the above rules.

The mobile client uses the mn_query_ha_bc API to retrieve the contents from the home agent.

Movement Detection

The mobile client can detect movement across IPv4 networks. In an embodiment, it relies on ifplugd, an external daemon which can work for wired and wireless networks. The ifplugd polls the network driver for change of status periodically. When it detects a change, it executes a preconfigured action. When the action is expected, the mip64d gets notified through its netlink socket which is monitored in its select loop. When mip64d detects that a new address is configured on the interface, it sends a tunnel update and a binding update to the home agent. In a specific implementation, the mobile client assumes that there is only one interface on the mobile client that changes to UP and DOWN.

In an implementation, the mobile client does optimize the case where it moves back to the same network. The mobile client attempts to use the previously valid address, and it that fails, the mobile node then attempts to get a new IPv4 address from the network (e.g., using DHCP). It also updates the end-to-end tunnel if necessary.

Data Flow and IPSec

The packet format is as follows.

With NAT: IPv4 UDP IPv6 IPsec <Payload>

Without NAT: IPv4 IPv6 IPsec <Payload>

Security

In an embodiment of the PIANO software, all links between client and server and client to client can be encrypted, including all IPv4 tunnels (used when a client connects to the Internet for authentication at the PIANO server, and to register the IPv6/IPv4 address binding), and all IPv6 tunnels over which flows user data. The encryption methodology will implement a highly secure key exchange mechanism utilizing AES encryption methodologies, ensuring that all data is encrypted from machine to machine, and the source machine encrypts uniquely for the target machine.

Additional Features of PIANO Architecture

Implementation of Closed User Groups" or "Groups": Groups allow communities of PIANO client to establish a private Group for PIANO services, similar to a VPN. Only PIANO members within the group may connect to each other for secure file sharing. Examples would be a small business that wishes to have a VPN amongst all employees to access a shared file server.

A home agent can manage any number of groups. There may be clients that are members of two or more groups. The members of each group will only know and have information about other members in the group.

Strong Security Architecture: In an embodiment, there is a strong security architecture that leverages AES and a private key methodology, such that each PIANO client encrypts the data to be sent specifically for the destination PIANO Client.

Secure SIP VoIP Communications, including Conferencing: Enterprises like VoIP due to the cost savings but often do not deploy due to the security concerns as well as Firewall/NAT connectivity issues which sometimes make hotel and hot spot access a problem. Unlike other peer-to-peer VoIP services, PIANO clients do not have to utilize the insecure method of broadcasting their IP address to identify themselves to other users. PIANO clients know exactly when other members of their group are on-line, and exactly how to set up a VoIP session. Leveraging PIANO secure connectivity, Enterprises can enjoy secure connectivity without risk of eavesdropping. Moreover the route optimization capabilities enable SIP calls to go peer-to-peer, thus eliminating unnecessary backhaul to data centers or transiting unknown third party computers as is the case with Skype-like services Proxy Security Services: While desktop PCs can be secured behind firewalls and virus scanners, this is much more difficult for mobile workers. Enterprises must either backhaul all traffic to their facility or continuously attempt to update mobile computers (both solutions being cumbersome). With PIANO, the web browser is rerouted to the PIANO server via IPv6 over IPv4 tunnel where virus scanners and SPAM blockers are located. The PIANO architecture enables common policy enforcement without the need to backhaul mobile user traffic to the enterprise.

Wi-Fi/WiMax/WiBro Mobility: Currently service providers purchase VLAN switches to create mobility for metro Wi-Fi and WiMax users. VLAN switches are expensive as well as backhaul traffic to either a central or originating switch. PIANO VoIP sessions would automatically reestablish and route optimize users and SIP gateways without the need of a VLAN switch. Running on PDAs or small portable computers, PIANO users would experience 3G like services at a fraction of the cost of cellular 3G services. Fast handoff functionality and dual mode handsets must be implemented to achieve less than 250-millisecond switching Instant Messaging: An instant messaging capability which would run over the secure IPv6 tunnel, and have buddy list of group members and a presence indicator.

Microsoft Outlook support: The ability to send and receive encrypted Outlook emails between members of a group. This would require a Microsoft server resident variant of the PIANO client capable of maintaining persistent sessions with up to 100,000 PIANO client enabled devices.

Redundant PIANO Server: Distributed or hierarchical to be determined. Single image Directory or regional to be determined. Availability of service should exceed 99.999 percent.

Centralized Management of User Rights and Privileges: Residing on the PIANO server, the centralized management functions allow end customer central administration to control the adding and deleting of employees to a PIANO group, as well as assigning their rights and privileges.

Example of User Experience Using PIANO Mobile IPv6 Client

The client will interact with the PIANO Server utilizing the PIANO defined packet formats and messages.

PIANO Client Interaction with Windows XP: In commercial service, the PIANO client will be downloaded and installed by the user in his Windows machine. In a specific implementation, the client software will be loaded from CD onto the target machine. Alternatively, the client may be downloaded and installed. The client software shall utilize any of the standard commercial tools (e.g., Install Shield) to install on the system. The PIANO client will be "always on" to monitor the availability or unavailability of an Internet connection. It must launch at machine start-up and stay alive as a background process. Thus the install process must make the necessary Windows registry entries to support this. A desktop icon will be installed, which will activate the PIANO desktop user interface.

The PIANO client software shall be able to run as a background process, without being flagged as a virus or spyware by the commercially available tools from vendors like Symantic, Trend Micro, and others. The PIANO client shall also be able to tunnel through firewalls from the leading vendors: Microsoft, ZoneAlarm, and others. The PIANO client background processes shall not have conflicts with other typical processes running on Windows machines.

Figure 12:
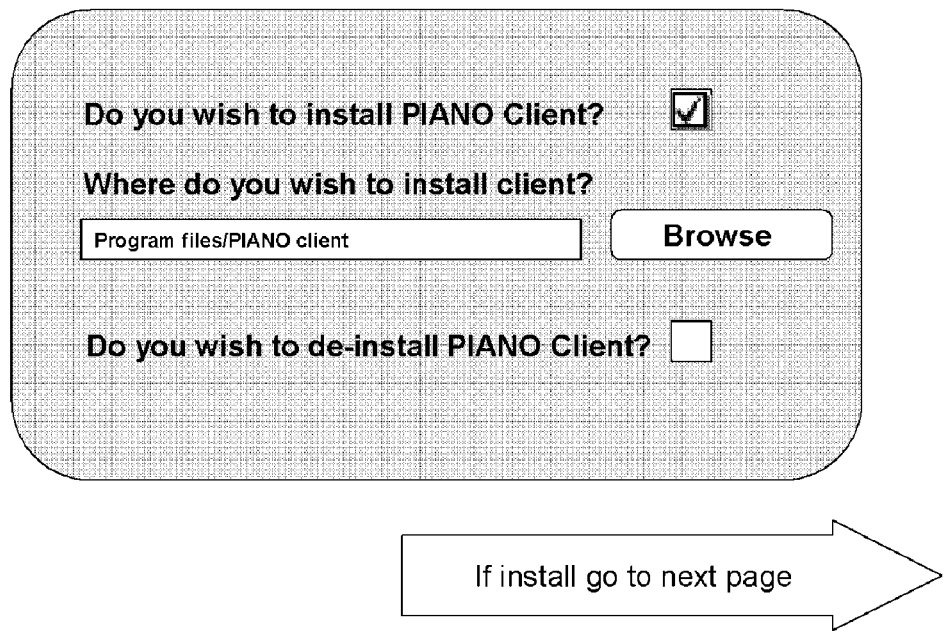
FIG. 12 shows a first installation screen.

FIG. 12 shows a first installation screen. The first screen asks users if they want to install the client. The client prompts the user on the installation location—as with all applications. For those clients who have the client there is a deinstall option.

The install will include the IPv4 address or URL for the web server. When the client software is loaded the mobile client will connect to the URL of the web server.

Figure 13:
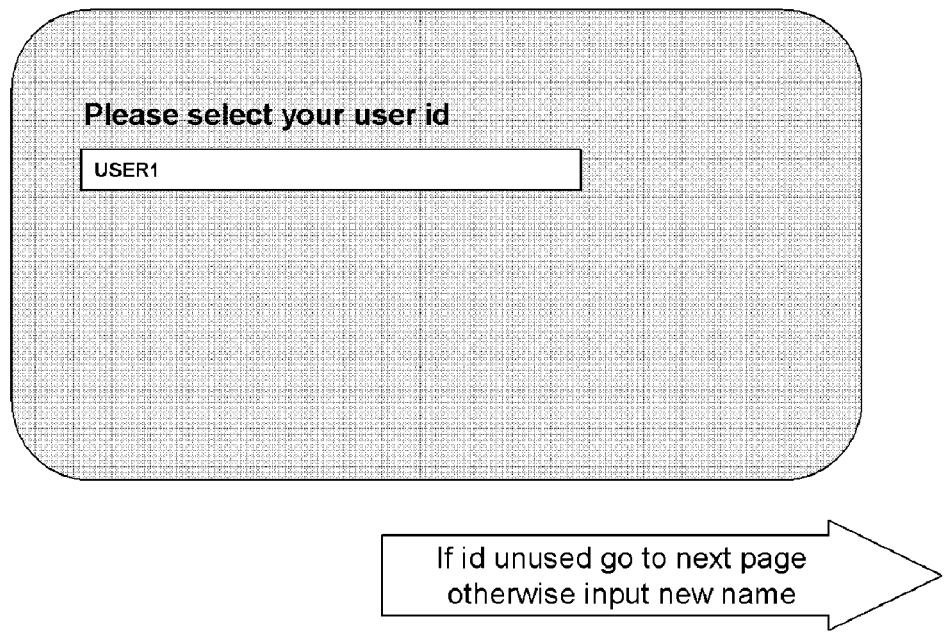
FIG. 13 shows a second installation screen.

FIG. 13 shows a second installation screen for entering a user ID. The MOBILE CLIENT will be asked to enter a <user ID>, and will then be assigned an IPv6 address by the web server. The web server will then send a message to the PIANO server providing the new user ID and IPv6 address, in XML tagged format. Since the user ID must be unique, the PIANO server will check the new <user ID> against existing directory entries. If the name is unique then the entry is set up in the PIANO server directory, and a confirm message is returned to the Web server. If the user ID is not unique, the PIANO server will send a message to the Web Server requesting an alternate <user ID>. The web server will prompt the user to select a new <user ID>.

Figure 14:
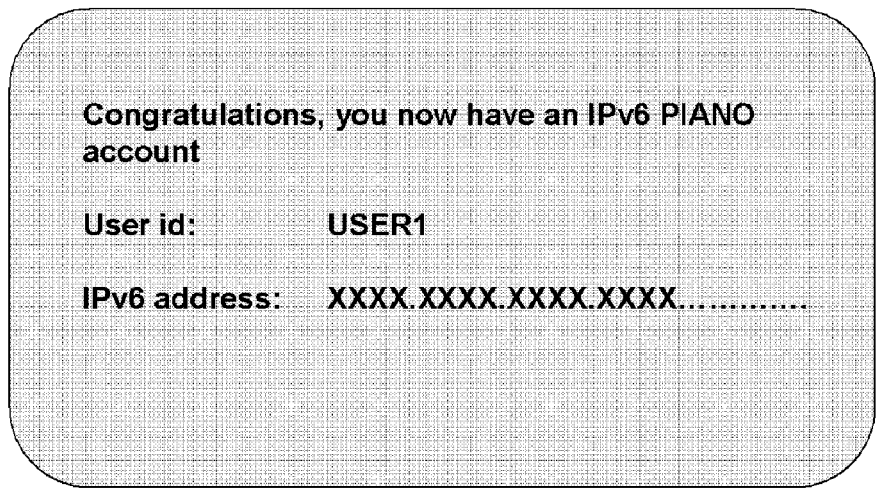
FIG. 14 shows a third installation screen.

FIG. 14 shows a third installation screen where the web server then sends a message to the client that the account has been set up.

Figure 15:
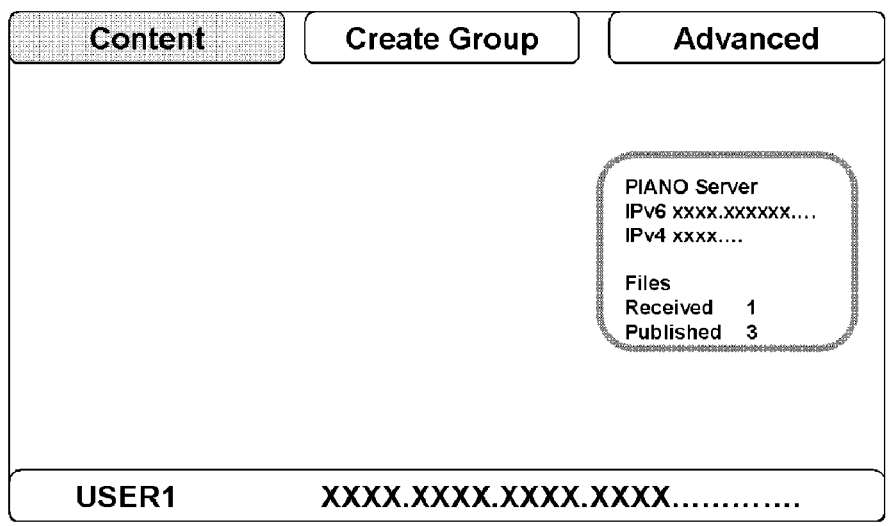
FIG. 15 shows a first user screen.

FIG. 15 shows a first user account screen. The first the user will see is a blank GUI except for the PIANO server folder. The PIANO server folder is for common documents such as help manuals that will appear on every users GUI. The PIANO folder status shows that one document has already been sent to the user while three documents are available for download. If users click on the PIANO folder they will be able to view the contents.

Figure 16:
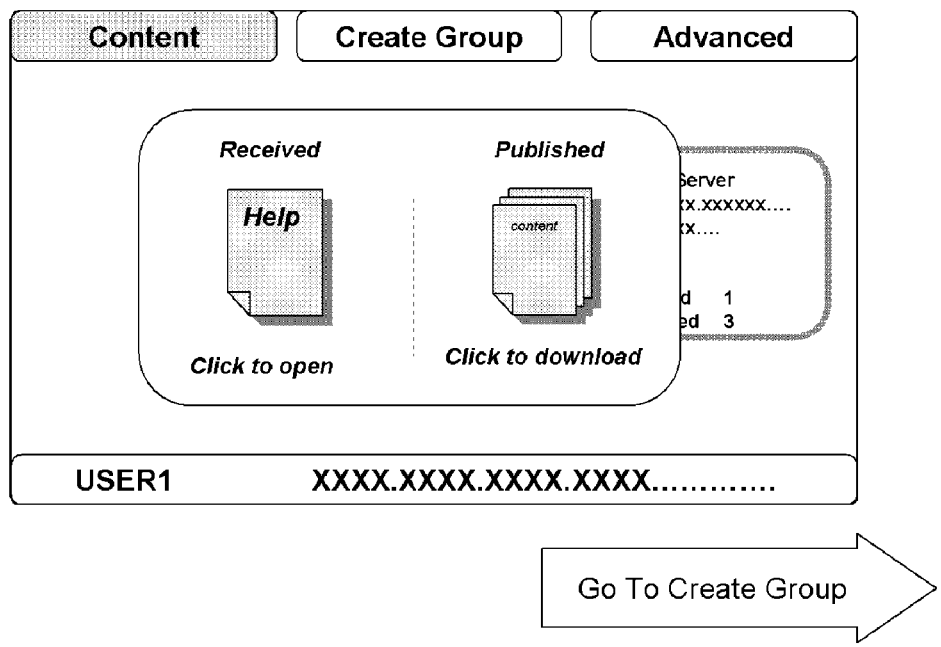
FIG. 16 shows a view folders screen.

FIG. 16 shows a view folders screen. Upon clicking the PIANO folder the user can view documents (in this case the HELP manual) which has been sent (or PUSHED) to them and is available locally. Users will also see titles of documents that are published—i.e., available for download by clicking.

Figure 17:
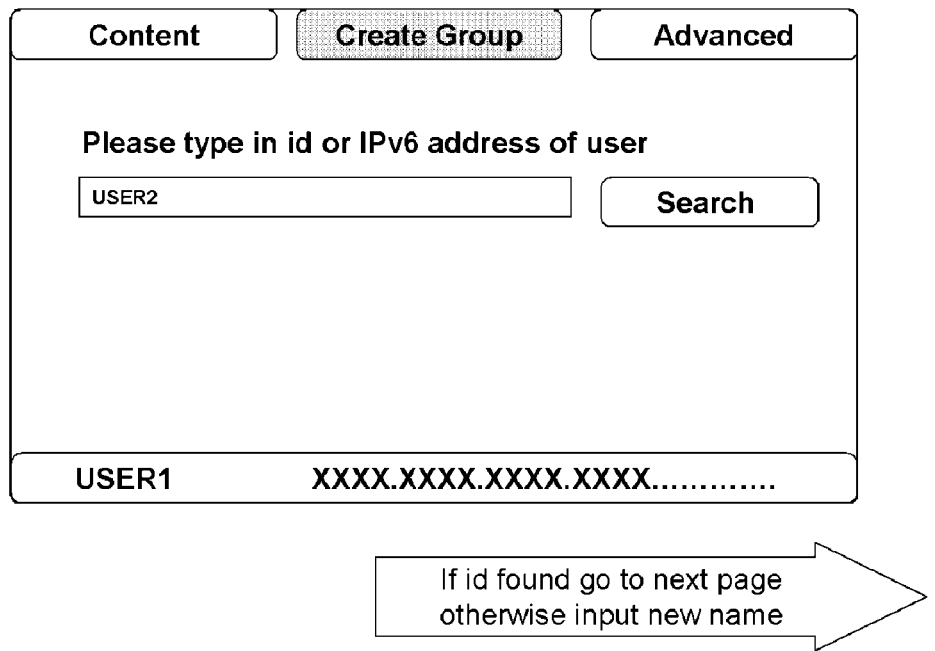
FIG. 17 shows a create group screen.

FIG. 17 shows a create group screen. Users can now create folders to send & share content with other users. To create a group the user must simply type in the valid id of another user. If they are unsure of the id they will be able to search the list of active users from the PIANO server. In this example the user user1 has typed in the name user2 on his create group interface to add a content folder to his GUI.

Figure 18:
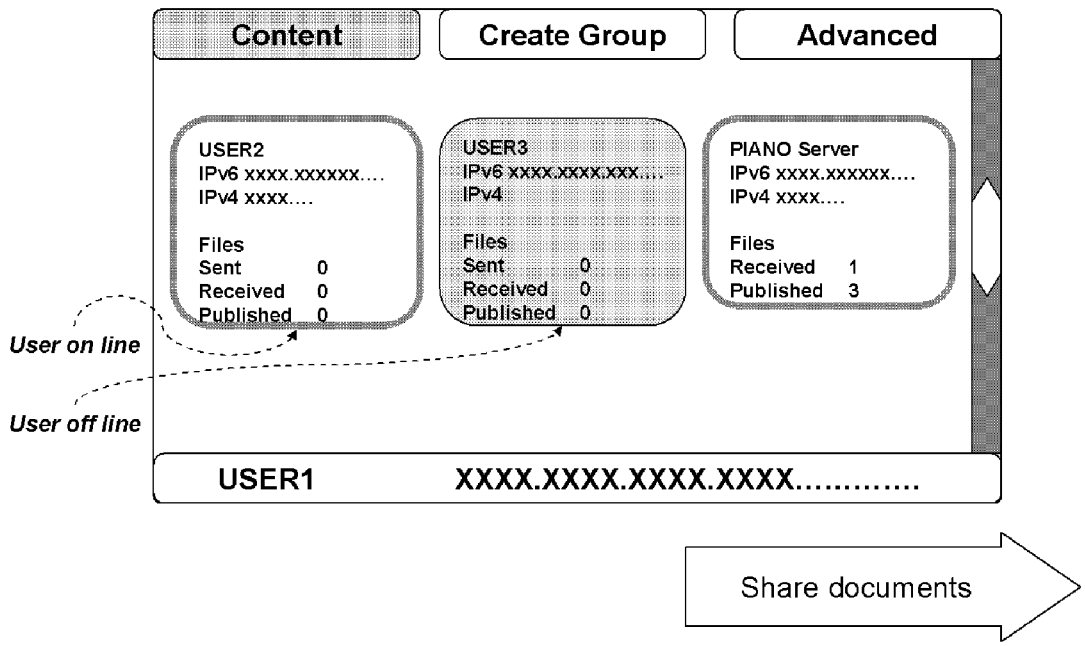
FIG. 18 shows a create content folder screen for other users.

FIG. 18 shows a create content folder screen for other users. The PIANO client then creates content folders for other users. As there is no content from the other users the status tables within the folders will be blank. There will be no limit on the number of content folders a user can create. Users that happen to be on-line (which the client will know by receiving the binding update from the PIANO server) will have a green colored folder. Off-line users will appear as a black colored folder. When user1 creates a user2 folder on his client, the client automatically creates a user1 folder on user2's client-even without his asking.

Figure 19:
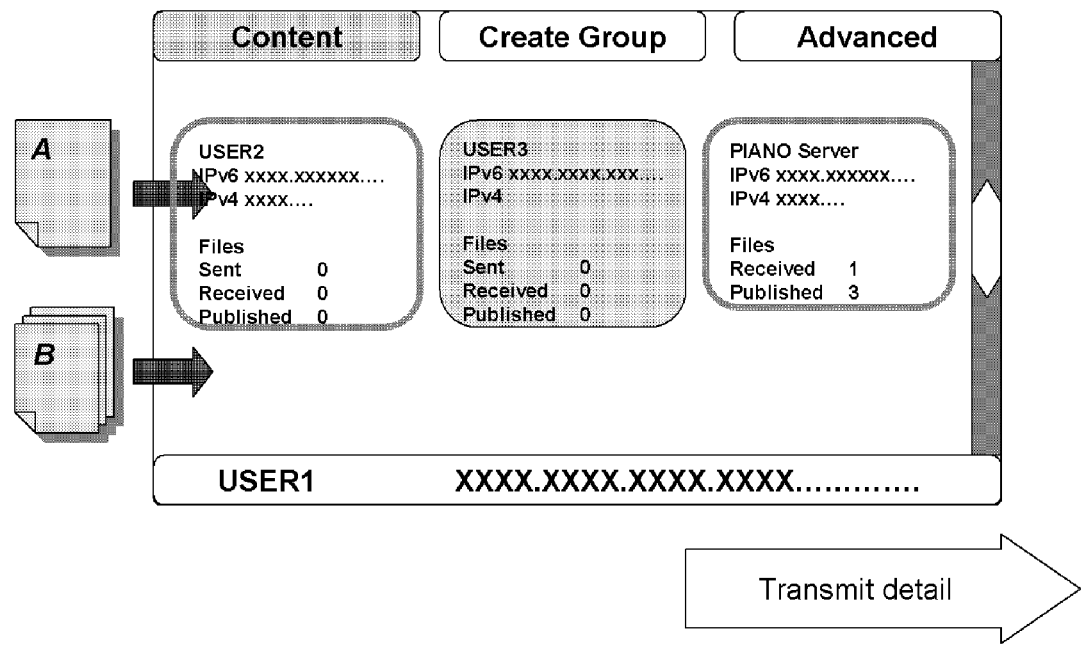
FIG. 19 shows a share documents screen.

FIG. 19 shows a share documents screen. Now that user1 has a user2 folder he can both send (or PUSH) as well as publish content with him. To send content to a user (in this case document A to user2), user1 simply drags the document to user2's folder. To publish content user1 simply drags content to his GUI. Note published content will be available to all users. Thus both user2 and user3 will be able to view document B, C, or D.

Figure 20:
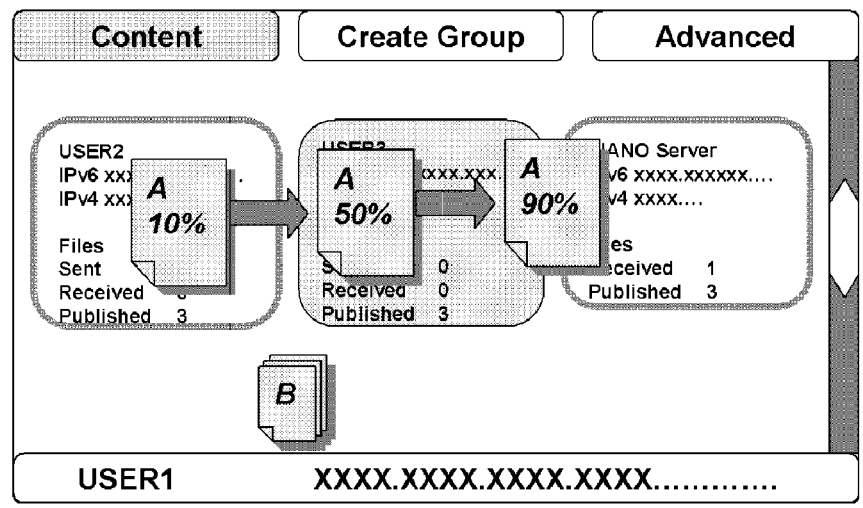
FIG. 20 shows a transmit detail screen.

FIG. 20 shows a transmit detail screen. As sent content is actually transmitted to the other user a progress animation will appear. If the user is on-line it will present again the content going directly to them. If the user is off-line (like User3) it will represent the content moving to the PIANO server. There will be no progress animation for PUBLISHED content as only the document names are being sent.

Figure 21:
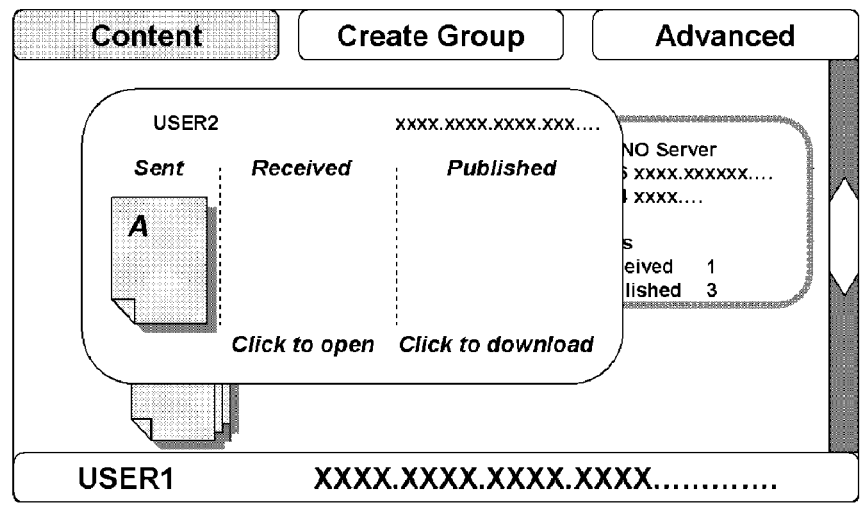
FIG. 21 shows a check status screen.

FIG. 21 shows a check status screen. Now that the document has been sent User1 can click on User2's folder to check status. He can see that the document has been sent. User1 can also see if User2 has either sent him something or published content to him.

Figures 22, 23:
FIG. 22 shows an options screen.
FIG. 23 shows transaction log screen.

FIG. 22 shows an options screen. User1 also has the option of disabling some of the automatic group creation and transmit features. For example, user1 can disable other people from adding him to their client. If user1 disables a function (like receiving documents) he will be prompted by a pop-up that user2 is requesting to send a file. User1 can also view a transaction log of all of the events.

FIG. 23 shows transaction log screen. The transaction log shows everything from when user1 sent a binding update to the PIANO server. When user1 received a binding update for user2 (from the PIANO server) When user1 sent (or pushed) a document to user2 and so forth.

Figure 24:
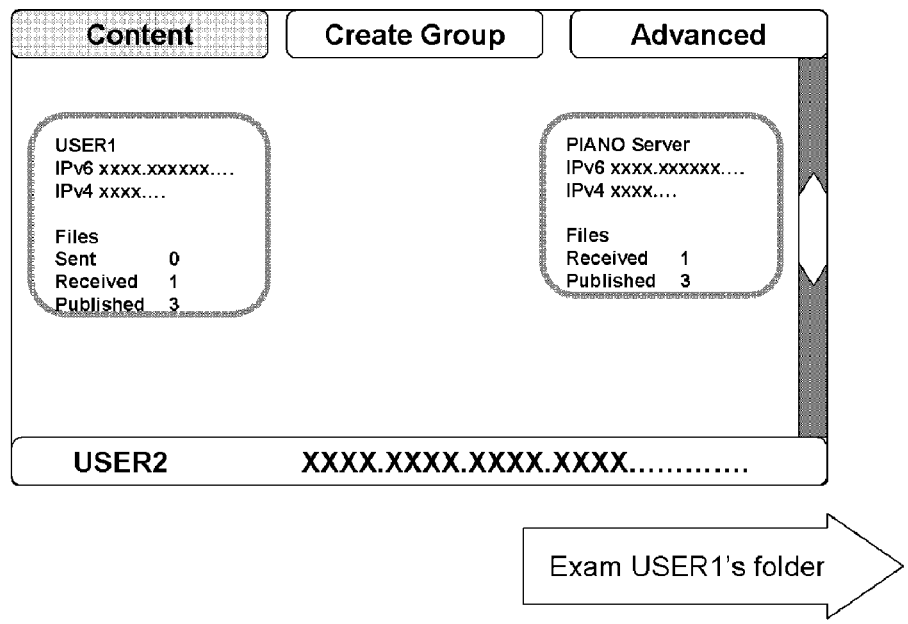
FIG. 24 shows an interface screen for another user.

FIG. 24 shows an interface screen for another user. Moving to user2's GUI we see that there is now a folder for user1 which was automatically created. The folder shows that user1 has sent him one document and published three. User2 can exam the contents of user1's folder by clicking on it. Note as neither user3 nor user2 decided to create a folder for each other—user3's folder is not on user2's GUI.

Figure 25:
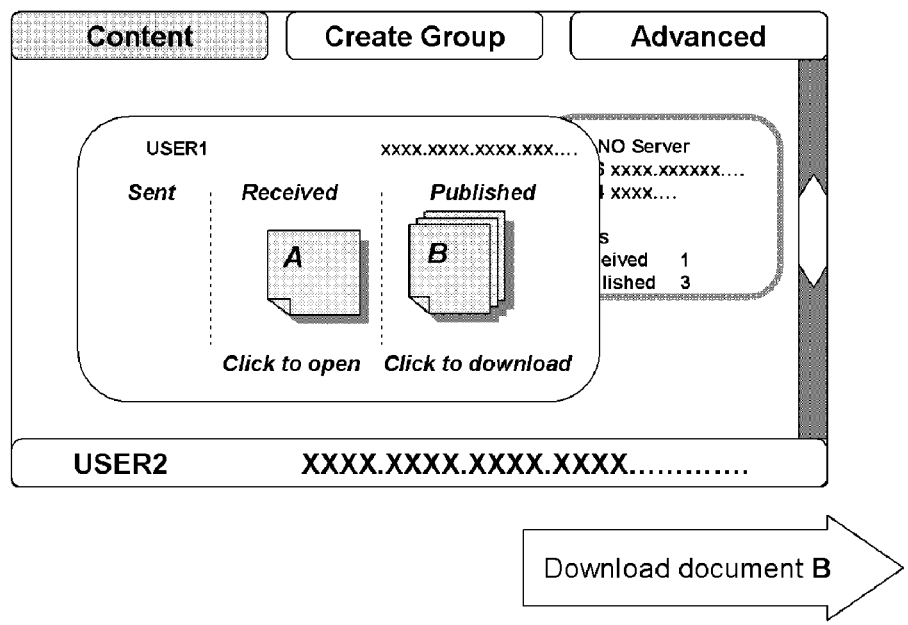
FIG. 25 shows examining another user's folder.

FIG. 25 shows examining another user's folder. When user2's clicks on user1's folder he see that he has been sent a document "A" and has three others which have been published. User2 now decides that he wants to download document "B"—which he does by clicking.

Figure 26:
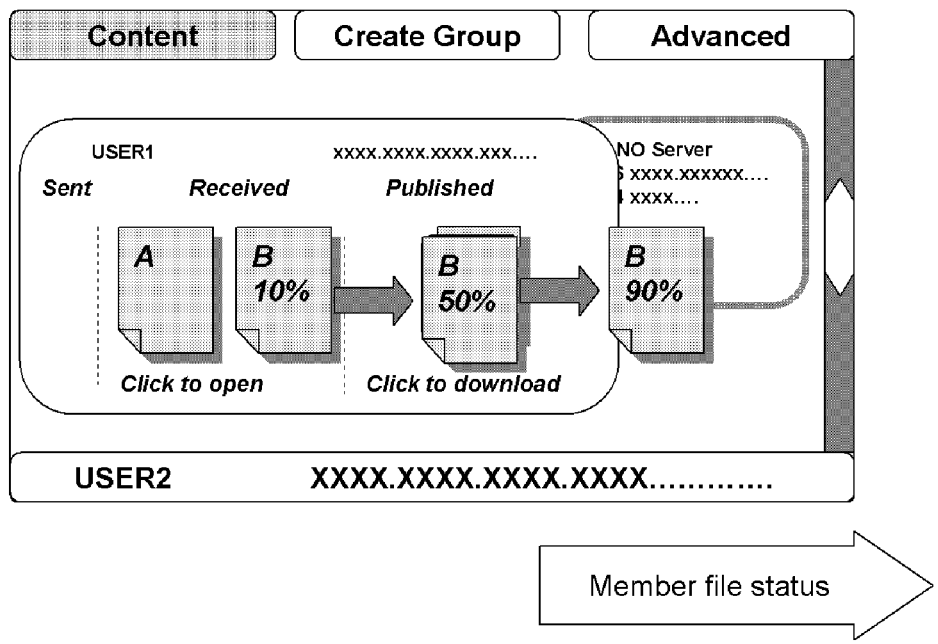
FIG. 26 shows downloading a document.

FIG. 26 shows downloading a document. When user2 clicks on document "B" it creates an animation status if the other user is on-line. If the user is not on-line, the PULL command is sent to the PIANO server for later retrieval.

Figure 27:
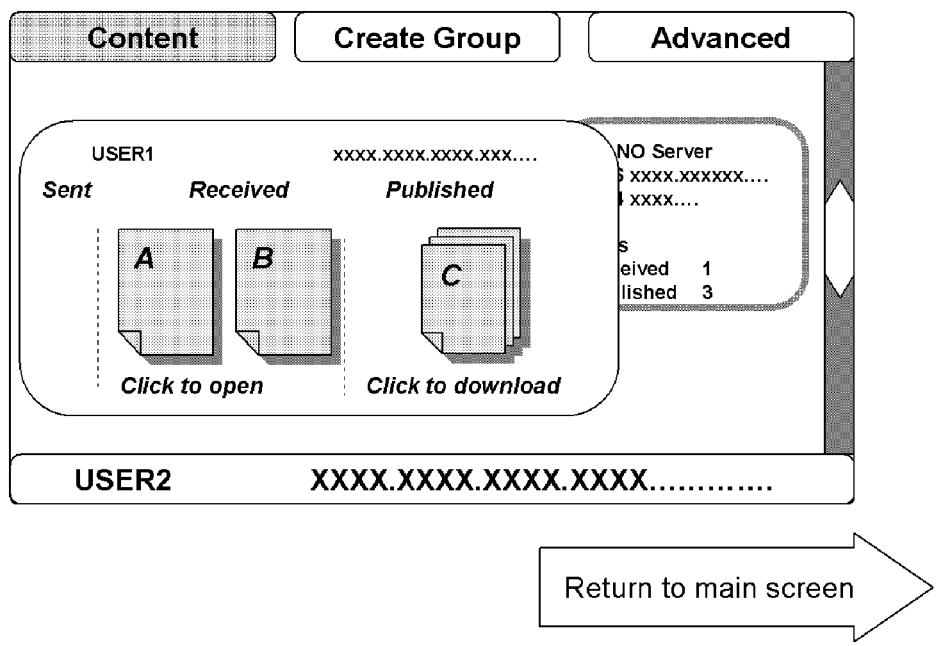
FIG. 27 shows a file status screen.

FIG. 27 shows a file status screen. When the download is complete the document "B" viewable by simply clicking on it.

Figure 28:
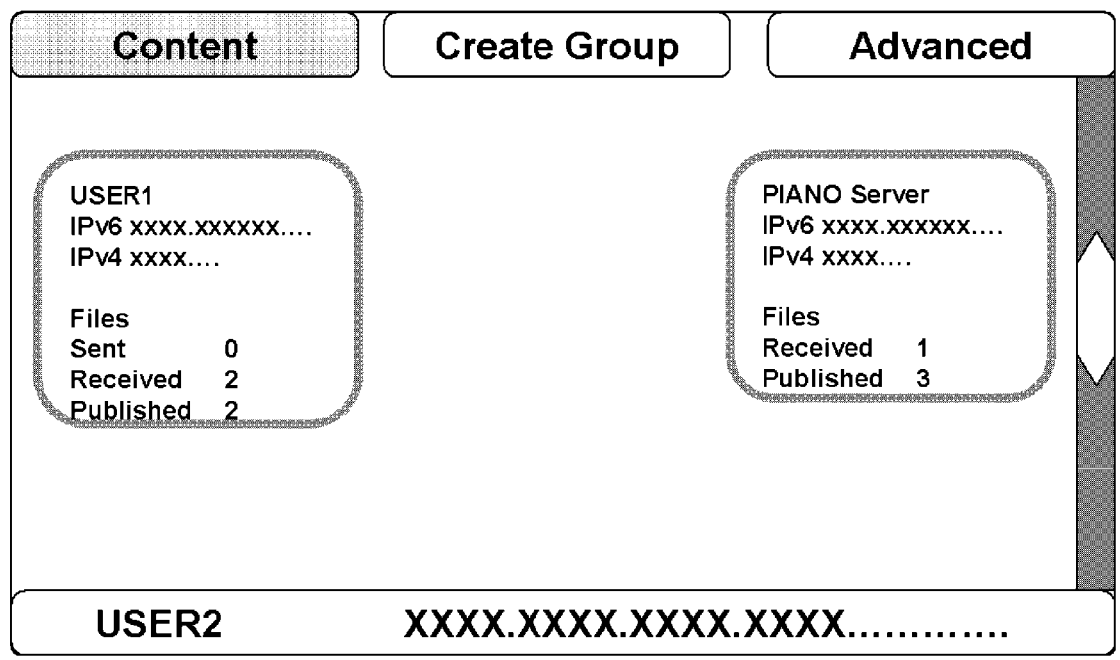
FIG. 28 shows a status update on a main screen.

FIG. 28 shows a status update on a main screen. When user2 closes the folder he can see that the status has been updated showing two files received and two files published from user1.

The PIANO graphical user interface is a method by which users can interact with the PIANO client to invoke PIANO applications. The interface is graphical, intuitive, and easy to use. The GUI window pops up in a window with the standard Microsoft minimize, maximize, and close buttons on the top right corner. There may be additional pull-down menus to support other services.

The GUI has standard user computer actions: point and click, drag and drop, and other operations to invoke PIANO applications. The user will launch the PIANO client by clicking on the desktop icon. In an embodiment, the user interface will appear as a simple pop-up window, with a list of folders and names representing the PIANO client "Buddy List." Each folder will represent a contact person's PIANO client for the purpose of sending and receiving files.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a home agent server, coupled to an Internet Protocol version 4 (IPv4) network, managing a plurality of groups of Internet Protocol version 6 (IPv6) clients;
providing a first IPv6 client and second IPv6 client coupled to the home agent via the IPv4 network, wherein the first and second IPv6 clients are in a first group, and the first and second IPv6 clients do not have access to IPv6 addresses of IPv6 clients managed by the home agent not in the first group;
from the first IPv6 client, sending to the home agent an IPv4 address and IPv6 address associated with the first IPv6 client;
from the second IPv6 client, sending to the home agent an IPv4 address and IPv6 address associated with the second IPv6 client;
when the first and second IPv6 clients are connected to the home agent server, implementing a first IPv6-over-IPv4 tunnel in the IPv4 network between the first IPv6 client and the second IPv6 client, wherein the first IPv6-over-IPv4 tunnel is implemented without passing through the home agent;
from the first IPv6 client, transferring data in an encrypted form using the first IPv6-over-IPv4 tunnel directly from the first IPv6 client to the second IPv6 client, where the data does not pass through the home agent server;
providing a third IPv6 client in the first group coupled to the home agent;
implementing a second IPv6-over-IPv4 tunnel between the first IPv6 client and the third IPv6 client;
implementing a third IPv6-over-IPv4 tunnel between the second IPv6 client and the third IPv6 client;
when the second IPv6-over-IPv4 tunnel between the first IPv6 client and the third IPv6 client fails, attempting to connect the third IPv6 client to the first IPv6 client through the first and third IPv6-over-IPv4 tunnels; and
when the first and second IPv6-over-IPv4 tunnels fail, attempting to connect the third IPv6 client to the first IPv6 client through the home agent.

2. The method of claim 1 wherein the home agent comprises a client authentication directory and an IPv6 router that forwards traffic between IPv6-over-IPv4 tunnels without needing to decrypt the IPv6 payload.

3. The method of claim 1 wherein the when the first and second IPv6-over-IPv4 tunnels fail, attempting to connect the third IPv6 client to the first IPv6 client through the home agent comprises:
when the first IPv6-over-IPv4 tunnel becomes disconnected, continuing transferring data from the first IPv6 client in the encrypted form using a fourth IPv6-over-IPv4 tunnel between the first IPv6 client and the home agent to a data cache at the home agent server associated with the second IPv6 client.

4. The method of claim 3 wherein the data is stored in the data cache is stored in the encrypted form.

5. The method of claim 3 further comprising:
when the second IPv6 client becomes reconnected to the home agent server, transferring data from the data cache to the second IPv6 client.

6. The method of claim 1 comprising:
sending the IPv4 address and IPv6 address associated with the second IPv6 client to the first IPv6 client.

7. The method of claim 6 comprising:
sending the IPv4 address and IPv6 address associated with the first IPv6 client to the second IPv6 client.

8. The method of claim 1 further comprising:
when the first IPv6 client initiates a data transfer to the second IPv6 clients, at the home agent server, determining whether the first and second IPv6 client are behind a network address translation (NAT) firewall.

9. The method of claim 8 wherein the first IPv6 client makes a determination of whether the first IPv6 client is behind a firewall by comparing its private IPv4 address and its public IPv4 address, which is received from the home agent server.

10. The method of claim 9 wherein if the private IPv4 address is the same as the public IPv4, the first IPv6 client is not behind a firewall.

11. The method of claim 10 wherein if a public IPv4 address of the first IPv6 client is the same as a public IPv4 address of the second IPv6 client, then the first and second IPv6 are behind the same NAT firewall.

12. The method of claim 11 further comprising:
if the first and second IPv6 clients are behind the same NAT firewall, implementing a second IPv6 tunnel in the IPv4 network between the first IPv6 client and the second IPv6 client using a private IPv4 address of the first IPv6 client and a private IPv4 address of the second IPv6 client; and
from the first IPv6 client, transferring data in an encrypted form using the second IPv6 tunnel directly from the first IPv6 client to the second IPv6 client, where the data does not pass through the home agent server.

13. The method of claim 8 wherein the first IPv6 client makes a determination of whether the second IPv4 client is behind a firewall by comparing the second IPv4 client's private IPv4 address and public IPv4 address, both of which are received from the home agent server.

14. The method of claim 8 further comprising:
if both first and second IPv6 clients are each behind different firewalls, transferring data between the first and second IPv6 clients by passing the data through the home agent server, wherein the data is encrypted at the first IPv6 client and decrypted at the second IPv6 client.

15. The method of claim 14 wherein the data is not decrypted by the home agent server before passing the data on to the second IPv6 client.

16. The method of claim 8 further comprising:
if the first IPv6 client is behind a firewall and the second IPv6 client is not behind a firewall, initiating a second IPv6 tunnel from the second IPv6 client to the first IPv6 client; and
from the first IPv6 client, transferring data in an encrypted form using the second IPv6 tunnel directly from the first IPv6 client to the second IPv6 client, where the data does not pass through the home agent server.

17. The method of claim 1 further comprising:
after a third IPv6 client in the first group loses connectivity to the home agent server and later reestablishes a connection to the home agent server, updating the first and second IPv6 clients in the first group with connectivity information of the third IPv6 client.

18. The method of claim 1 further comprising:
publishing a list of shared files available for download to the IPv6 clients in the first group.

19. A method comprising:
providing a home agent server, coupled to a plurality of Internet Protocol version 6 (IPv6) clients organized in groups, all connected in an Internet Protocol version 4 (IPv4) network;
providing a set of IPv6 commands comprising a PUSH command to transfer data over the IPv4 network through an IPv6-over-IPv4 tunnel, without passing through the home agent, from one of the IPv6 clients in one group to another IPv6 client in the same group, a PUBLISH command to show clients in one group files available to other clients in the same group, and a PULL command to request sending of at least one file made available through the PUBLISH command from the client having the file;
issuing a PUSH command from a first IPv6 client of in a first group to transfer data to a second IPv6 client in the first group through an IPv6-over-IPv4 tunnel, without passing through the home agent;
when the second IPv6 client is connected the network, executing the PUSH command by transferring the data directly from the first IPv6 client to the second IPv6 client, without passing through the home agent;
when the second IPv6 client is not connected the network, executing the PUSH command by transferring the data to a data cache on the home agent server; and
when the second IPv6 client connects to the network, transferring the data from the data cache to the second IPv6 client.

20. The method of claim 19 comprising:
issuing a PULL command from the first IPv6 client of in the first group to request a data transfer from a third IPv6 client in the first group;
when the third IPv6 client is connected the network, executing the PUSH command by transferring the data directly from the third IPv6 client to the first IPv6 client;
when the third client is not connected the network, storing the PUSH command in the data cache of the home agent server; and
when the third IPv6 client connects to the network, checking whether the first client is connected to the network.

21. The method of claim 20 further comprising:
if the first IPv6 client is connected to the network, initiating transferring of the data from the third IPv6 client to the second IPv6 client through an IPv6-over-IPv4 tunnel, without passing through the home agent;
if the first IPv6 client is not connected to the network, transferring the data to the data cache on the home agent server.

22. The method of claim 21 further comprising:
when the first IPv6 client connects to the network after being disconnected, transferring the data from the data cache to the first IPv6 client.

23. The method of claim 19 further comprising:
issuing a PUBLISH command from the first IPv6 client of the first group to show at least one file available for download from the first IPv6 client to other clients in the first group; and
displaying a listing of the at least one file is provided to each of the IPv6 clients in the first group, but not other groups.

24. The method of claim 19 further comprising:
when the second IPv6 client connects to the network, performing a binding update which includes transferring an IP address of the second IPv6 client to the home agent server.

25. The method of claim 19 further comprising:
when the second IPv6 client connects to the network, performing a binding update which includes transferring an IP address of the second IPv6 client in the first IPv6 client.

* * * * *